United States Patent [19]

Rogozinski et al.

[11] Patent Number: 5,756,960
[45] Date of Patent: May 26, 1998

[54] DETECTING NON-SYMMETRICAL NOZZLE WEAR IN A PLASMA ARC TORCH

[75] Inventors: Maciej Wlodzimierz Rogozinski, Bulleen; Subramania Ramakrishnan, Balwyn North; Ashley Grant Doolette, Wishart, all of Australia; Nicholas A. Sanders, Norwich, Vt.; Richard W. Couch, Jr., Hanover, N.H.

[73] Assignee: Commonwealth Scientific and Industrial Research Organization, Australia

[21] Appl. No.: 716,267

[22] PCT Filed: Mar. 24, 1995

[86] PCT No.: PCT/AU95/00165
    § 371 Date: Sep. 24, 1996
    § 102(e) Date: Sep. 24, 1996

[87] PCT Pub. No.: WO95/26252
    PCT Pub. Date: Oct. 5, 1995

[30] Foreign Application Priority Data

Mar. 25, 1994 [AU] Australia ................ PM4710

[51] Int. Cl.⁶ .................................. B23K 10/00
[52] U.S. Cl. ......................... 219/121.54; 291/121.5; 291/121.59; 291/121.56; 291/121.46; 291/130.01; 291/124.34
[58] Field of Search .................. 219/121.45, 121.46, 219/121.59, 121.54, 121.56, 121.57, 130.01, 124.34, 124.1

[56] References Cited

U.S. PATENT DOCUMENTS

| | | | |
|---|---|---|---|
| 3,448,280 | 6/1969 | Blitchington, Jr et al. | 250/227 |
| 4,192,986 | 3/1980 | Udagawa et al. | 219/137 P |
| 4,333,052 | 6/1982 | Schmall | 324/208 |
| 4,513,195 | 4/1985 | Detriche | 219/124.34 |
| 4,621,184 | 11/1986 | Vancata . | |
| 5,225,658 | 7/1993 | Yamaguchi . | |
| 5,326,955 | 7/1994 | Nishi . | |
| 5,592,078 | 1/1997 | Giragosian et al. | 324/207.18 |

FOREIGN PATENT DOCUMENTS

| | | |
|---|---|---|
| 0213689 | 3/1987 | European Pat. Off. . |
| 0508481 | 10/1992 | European Pat. Off. . |
| 62-127173 | 6/1987 | Japan . |
| 1-030200 | 2/1989 | Japan . |
| 6-4195 | 1/1994 | Japan . |

*Primary Examiner*—Mark H. Paschall
*Attorney, Agent, or Firm*—Ladas & Parry

[57] ABSTRACT

A method and apparatus for detecting non-axisymmetric wear (i.e. grooving 22) of the orifice (12) of the nozzle (13) of a plasma arc torch (1) involves placement of a probe adjacent a plasma jet (21) that emerges from the nozzle (13) such that a number of electrically isolated elements (23) of the probe surround the jet (21) and measuring a voltage drop across an electrode (11) of the torch (1) and each probe element (23) to detect whether there is any deflection of the plasma jet (21). The presence of a groove (22) causes the jet (21) to deflect and is indicated by an increased voltage at the probe elements (23) towards which the jet is deflected and a decreased voltage at the opposite elements. The probe may be formed by segmenting a shield (17) of the torch. Alternatively, the voltage across an electrode (11) of a plasma torch (1) and an external electrode (30) that provides a sloping surface (31) to which the plasma arc jet attaches may be monitored while relatively rotating the torch (1) and the external electrode (30) to detect changes in length of the arc, any such change indicating that the nozzle of the torch is grooved. The degree of wear of a nozzle (i.e. size of a groove) is determinable by comparing the size of a measured voltage variation with a reference voltage representative of an ungrooved nozzle.

33 Claims, 24 Drawing Sheets

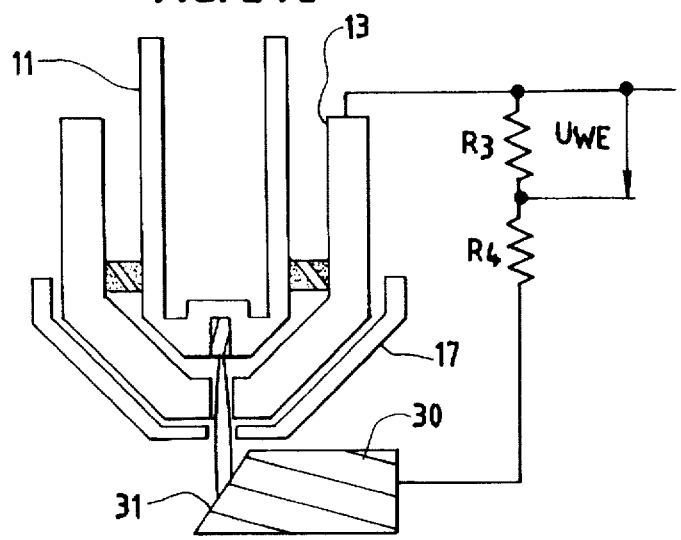
FIG. 24a
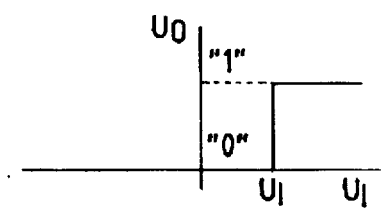
FIG. 24b
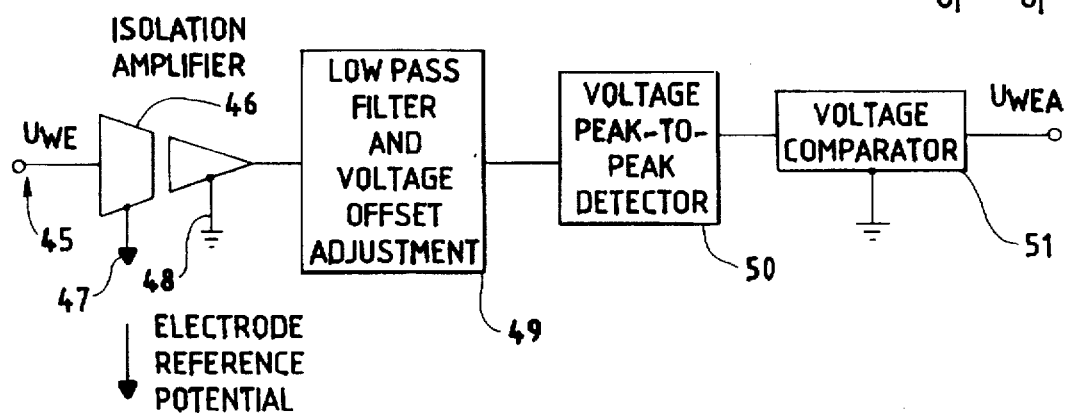

DETECTING NON-SYMMETRICAL NOZZLE WEAR IN A PLASMA ARC TORCH

TECHNICAL FIELD

This invention relates to a method and apparatus for monitoring the condition of a plasma arc torch and is directed in particular towards determining whether a nozzle of the torch has undergone any "non-axisymmetric" wear. Plasma arc torches to which the invention is applicable may be used for example for cutting metallic sheets or plates in metal fabrication, or in material spraying or waste destruction systems. The invention will be described hereinafter in relation to a plasma arc cutting torch, but it is to be understood that the application of the invention is not limited to such a cutting torch.

BACKGROUND

Plasma arc cutting processes make use of the heat and momentum of a high velocity plasma jet to sever materials by the dual actions of melting as well as vaporisation and material displacement along the jet path. The melting and vaporisation of the material relies on the heat from the plasma jet and from an electric arc established between an electrode of the plasma torch and the workpiece (that is, a transferred arc system) or between two electrodes in the torch (that is, a non-transferred arc system).

A typical plasma cutting system comprises a plasma cutting torch, power supply, arc igniter and consumables such as plasma and shield gases as well as torch coolant. The plasma torch can be hand held or can be mounted on a contouring machine such as a planar profiling machine, a 3-axis gantry or an articulated robotic manipulator. The plasma cutting torch includes an electrode (typically the cathode) centered above an orifice in a constricting nozzle. A suitable plasma forming gas flows under pressure around the electrode and through the nozzle orifice towards the workpiece. The arc is constricted by the nozzle and can be further constricted by shielding gas or water. An arc igniter is used to establish a pilot arc between the electrode and the nozzle and subsequently, under the influence of a strong gas flow, this arc transfers to the workpiece (in a transferred arc torch) and the pilot arc is extinguished.

The quality of the cut made with a plasma arc torch (which is determined by factors such as the dimensional accuracy of the cut parts, cut angle (degree of squareness of the cut face), sharpness of the bottom and top edges of the part, roughness of the cut face, amount of dross on the bottom of the plate (workpiece), amount of splatter on the top of the plate, etc.), is extremely sensitive to the condition of the torch and in particular to the condition of its electrode and nozzle, which are consumable parts. Presently, an operator usually visually supervises the cutting operation and stops cutting if the quality of the cut deteriorates. Such visual inspection of the cutting process is very cumbersome due to extreme brightness of the plasma arc, presence of metallic fumes, cut parts remaining in the workpiece plate until the cutting is completed for a given plate and often under-water or water-muffler cutting. Alternatively, the torch may be inspected by the operator in an off-line mode, either periodically or after deterioration of the cut quality has been observed. In order to increase the degree of autonomy of a plasma cutting system, increase its reliablity and consistency of the cut quality as well as reduce material waste, a method and an apparatus which are suitable for automatically testing and monitoring the condition of the torch are needed.

Condition monitoring is concerned with determining the type and degree of wear of consumable parts of a plasma arc torch, in particular the type and degree of erosion of the nozzle around the orifice and of the degree of erosion of an electron emitting element embedded in the electrode. For the nozzle, the following types of erosion can be distinguished:

(i) grooves on the outside of the nozzle around the orifice (this is an "non-axisymmetric" type of wear, as will be evident from the description given below with reference to FIG. 3).

(ii) approximately axisymmetric chamfer on the outside and/or inside of the nozzle around the orifice, and (iii) enlargement of the orifice diameter (also an approximately axisymmetric type of wear).

A combination of the above types of erosion often occurs. For example, wear of type (ii) and (iii) occurs after prolonged torch operation. On the other hand erosion of type (i) may result from double arcing (a phenomenon in which the arc is established between the electrode and the nozzle and the nozzle and the workpiece) or from prolonged pilot arc attachment at the nozzle. Double arcing can cause grooving of the outside nozzle surface around the orifice within a fraction of a second. Since the occurrence of the above phenomena depends on external conditions, the life-time of the nozzle may vary significantly and is unpredictable.

Nozzle erosion disturbs plasma gas flow and affects the cutting process. For example, erosion of type (i) causes deflection of the plasma jet in the groove direction leading to dimensional inaccuracy of the cut part and variation of the cut angle and of the amount of dross at the bottom of the workpiece plate along the part.

For a good nozzle and under correct process conditions most of the molten material is removed in a direction normal to the workpiece and practically no dross is formed. However, erosion of type (ii) or (iii) causes the pressure in the nozzle chamber to decrease and affects the mechanism of material removal resulting in dross formation at the bottom of the plate. That is, not all of the material is blown away and some of the molten material solidifies underneath the workpiece forming hard to remove dross. In extreme situations loss of cut can occur due to the lack of full material penetration by the plasma jet.

Erosion of the torch electrode can also occur. This involves gradual removal of the electron emitting material from an electron emitting insert in the electrode. This type of wear increases the arc length and therefore arc voltage, which alters the amount of power delivered to the workpiece and affects cut quality. Also, if automatic torch height control is used which utilises arc voltage as the controlled variable, the height control regulator will counteract the voltage increase by decreasing the torch standoff and may eventually drive the torch into the workpiece.

Plasma arc torch condition monitoring can be used to increase the degree of autonomy of plasma cutting systems in mechanised operations. Thus it can be utilised to signal faulty cutting conditions to an operator, stop the cutting operation and initiate automatic torch or consumables change. Such condition monitoring can increase productivity and efficiency and decrease the overall cost of mechanised plasma cutting operations.

DISCLOSURE OF THE INVENTION

It is an object of the present invention to provide methods and apparatus for detecting non-axisymmetric wear (that is, erosion of type (i) described above) of a nozzle which are suitable for including in on-line or off-line monitoring arrangements for the torch. (Detection of erosion of type (ii) and (iii), that is, axisymmetric wear, is the subject of the applicant's co-pending application, filed concurrently with the present application, entitled Plasma Torch Condition Monitoring, the disclosure of which is incorporated by this cross reference).

According to a first aspect of the invention there is provided a method for detecting non-axisymmetric wear of a nozzle of a plasma arc torch while a plasma jet is being generated by the torch including:

(i) arranging a probe adjacent to the plasma jet, (ii) measuring an electrical parameter associated with the plasma jet via the probe, and (iii) determining from said electrical parameter measurement whether there is any deflection of the plasma jet, said deflection being indicative of said non-axisymmetric wear.

According to a second aspect of the invention, apparatus is provided for the method of the first aspect of the invention comprising, a plasma torch having a probe for measuring an electrical parameter associated with a plasma jet, wherein the probe is adapted to detect deflections of a plasma jet generated by the torch.

In its most broad meaning, the adaptation of the probe in the above-defined second aspect of the invention may be achieved by suitable placement of the probe adjacent the position of the jet as it emerges from the nozzle orifice.

Preferably the probe comprises a plurality of elements for providing measurements of the electrical parameter for different locations around the plasma jet.

Preferably the probe also constitutes a component of the torch and in particular it may be formed from a shield associated with the torch by segmenting the shield and electrically isolating the segments. Alternatively the probe may be constituted by a number of electrically isolated transverse wires surrounding and pointing towards the plasma jet, and equi spaced from the torch axis.

Preferably the electrical parameter associated with the plasma jet which is measured is voltage and preferably voltages between the probe elements or segments and the torch electrode or torch nozzle are measured. Alternatively, another electrical parameter, such as for example capacitance between the plasma jet and an adjacent surface of the probe or a leakage current between the plasma jet and the probe may be measured.

Effectively, the electrical parameter associated with the plasma jet which is measured, be it current or voltage, is a measure of the impedance of the sheath between the high temperature plasma jet and the probe. The sheath impedance is a nonlinear function of several parameters including sheath thickness and gas composition. The temperature in the plasma jet may reach 20,000K but it decreases to a few hundred K across the plasma sheath. The plasma sheath thickness is in the order of fractions of a mm. Hence, there is a high temperature gradient across the plasma sheath. Due to the high temperature gradient, there is a high electrical conductivity gradient across the sheath. Hence, the sheath impedance is a strong function of the plasma sheath thickness.

Preferably, in order to increase the sensitivity of the measurement of the electrical parameter to the nozzle wear, the probe elements or segments are suitably biased. Such biasing may be achieved by a divided resistance network or by applying a biasing voltage source (either AC or DC) to the probe.

It will be appreciated that in the above described first and second aspects of the invention, the probe is such as to provide directional sensitivity as will allow deflections of the plasma jet to be determined from the parameter being measured. This use of a directional probe is particularly suitable for "on-line" applications of the invention. However, the invention also includes a method and apparatus wherein non-axisymmetric wear may be determined by detecting a change in length of the plasma arc rather than its deflection.

Thus, according to a third aspect of the invention, there is provided a method for detecting non-axisymmetric wear of a nozzle of a plasma arc torch while a plasma jet is being generated by the torch including measuring an electrical parameter associated with the plasma jet while relatively rotating the torch and an external electrode surface on which the plasma arc from the torch is attached and which is angled with respect to the torch axis, and determining from said electrical parameter whether there is any change in length of the plasma arc, said change in length being indicative of said non-axisymmetric wear.

For a plasma arc cutting torch the electrode surface on which the plasma arc is attached in performing the method of the third aspect of the invention may be the surface through a plate which is formed in cutting the plate using the torch. Thus this third aspect of the invention is also suitable for on-line monitoring of the torch. Alternatively, the electrode surface may be provided by a suitably adapted test workpiece.

Thus, according to a fourth aspect of the invention, apparatus is provided for monitoring for non-axisymmetric wear of a nozzle of a plasma arc torch while a plasma jet is being generated by the torch, comprising an external electrode mounted in proximity to the plasma torch, wherein the external electrode provides a sloping surface with respect to the torch axis for attachment thereto of an end of a plasma arc generated by the torch, the electrode and torch being relatively rotatable, and furthermore including means for measuring an electrical parameter associated with the plasma jet for determining a change in length of an arc as the torch and sloping surface are moved relative to each other.

Preferably the electrical parameter that is measured according to the third and fourth aspects of the invention is voltage, in particular the torch electrode to workpiece, or torch electrode to external electrode voltage is measured. It will be appreciated that the use of an external electrode (as included within the scope of the third aspect of the invention and the presence of which is defined in the fourth aspect of the invention) is suitable for off-line implementation.

BRIEF DESCRIPTION OF THE DRAWINGS

Embodiments of the invention will now be described, by way of example only, with reference to the accompanying drawings in which:

FIGS. 24(a) and (b) illustrate an apparatus set-up for detecting non-axisymmetric wear according to the third or fourth aspects of the invention.

DETAILED DESCRIPTION OF EMBODIMENTS INCLUDING BEST MODE OF PERFORMING THE INVENTION

In the following description, all tests were conducted using a Hypertherm, MAX200 Plasma Arc Cutting System with Machine Torch having components for 100A current and air plasma and air shield gas. This equipment is available from Hypertherm, Inc. of Hanover, N.H., United States of America.

Figure 1:
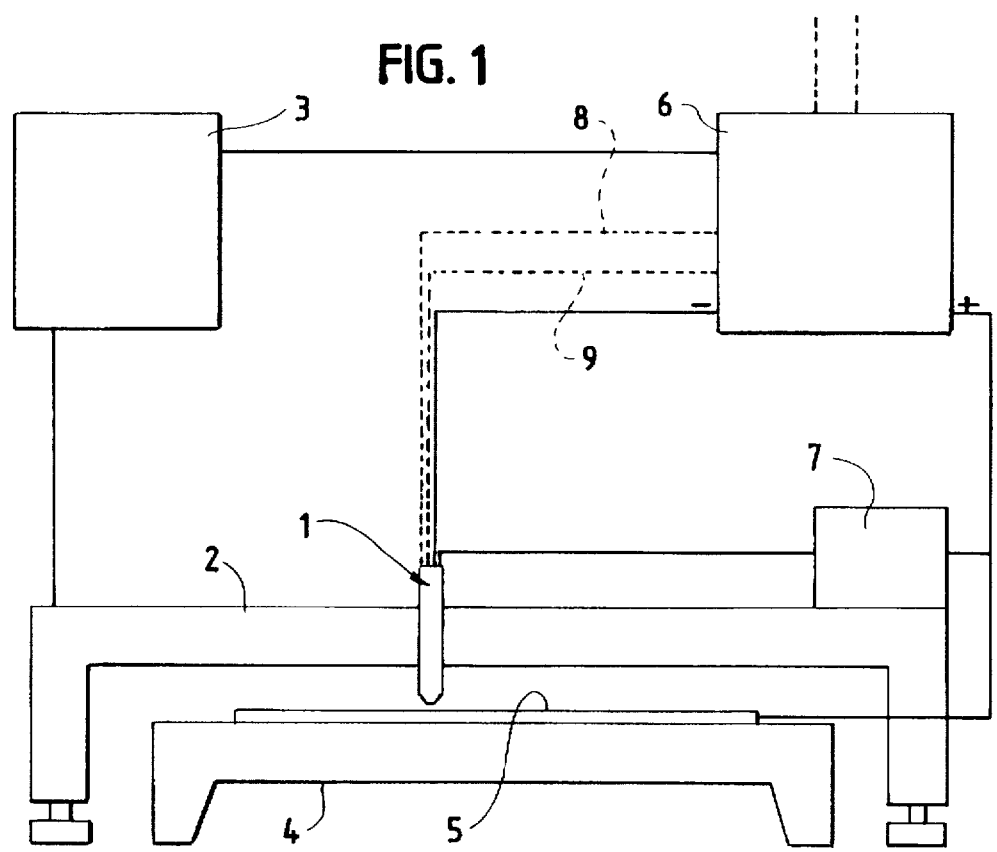
FIG. 1 illustrates a typical mechanised plasma cutting arrangement using a plasma arc torch.

Referring to FIG. 1, a typical mechanised plasma arc cutting system comprises a plasma arc cutting torch 1 mounted on the gantry 2 of a planar profiling machine. The gantry movement is controlled by computerised controller 3 over a cutting table 4 on which a workpiece 5 is supported. An electrical power supply 6 provides voltage and current for operation of the plasma arc torch, and arc ignition system 7 (typically a high frequency high voltage generator). Plasma and shield gases 8 and coolant 9 for the torch may be supplied by appropriate control means such as pumps and valves (not shown) associated with the power supply 6.

Figure 2:
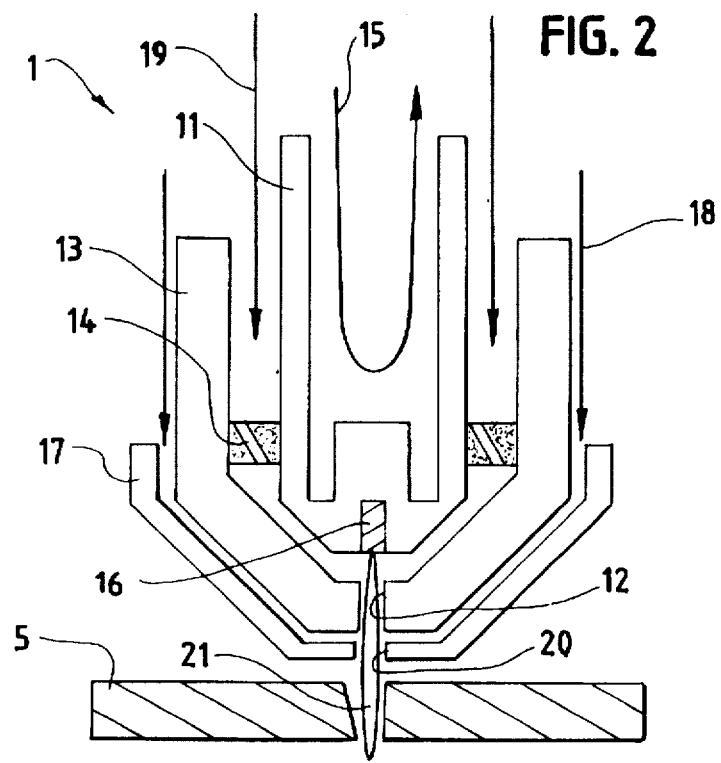
FIG. 2 illustrates the parts of a typical plasma cutting torch.

Details of a plasma arc cutting torch 1 of the FIG. 1 arrangement are shown in FIG. 2. The torch comprises an electrode 11, which is typically but not necessarily the cathode, centered over an orifice 12 in a constricting nozzle 13. Electrode 11 will usually be made of copper and has an electron emitting insert 16 in its tip. The electron emitting insert may be made of a material such as hafnium, zirconium or tungsten depending on the plasma forming gas which is used. The electrode may also be cooled, for example by circulation of a coolant 15 such as water, to reduce its wear. A plasma forming gas 19 such as air, oxygen, nitrogen or a mixture of argon and hydrogen is supplied under pressure to flow around the electrode 11 between the electrode and nozzle 13 and through the orifice 12 towards a workpiece 5. Nozzle 13 is also usually made of copper and may be cooled for example, by circulation of a coolant (not shown) to reduce its wear. The plasma forming gas 19 may pass through a swirl ring 14 which improves squareness of the cut on the part side of the workpiece.

The arc (and associated plasma jet) 21 is constricted by the nozzle 13 and can be further constricted by shielding gas 18 (or a shielding liquid, for example water) which is directed to the arc region by a shield 17 with the shielding gas 18 (or a shielding liquid) being supplied to a space between the nozzle 13 and shield 17. Shield 17 contains an orifice 20 for passage of the arc and plasma jet 21 and surrounding shielding gas. Shield 17 is also usually made of copper.

Figure 3A:
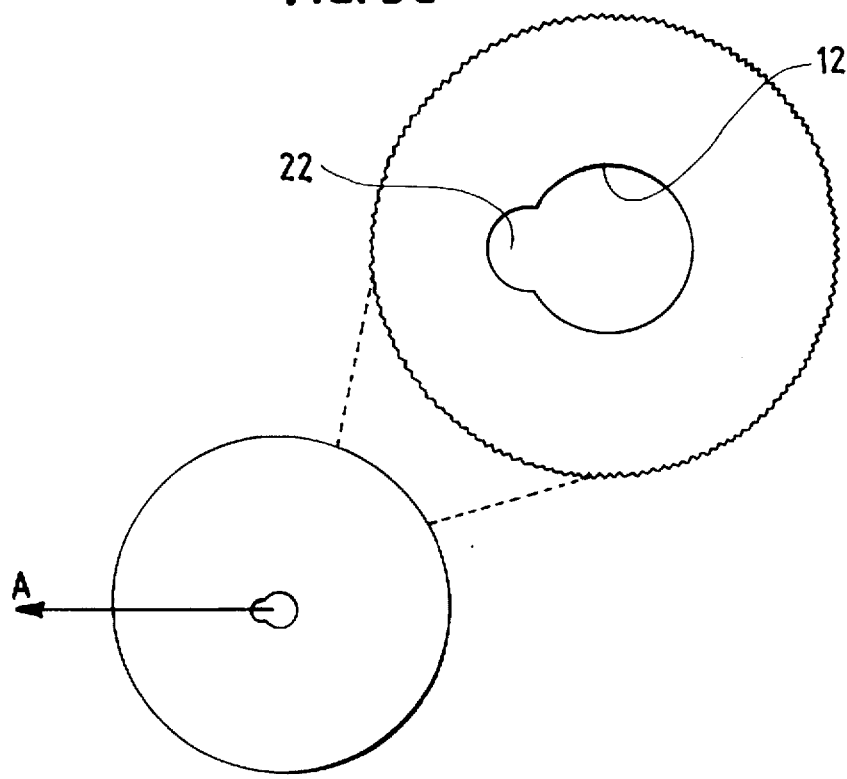
FIGS. 3(a) and (b) illustrate the non-axisymmetric type of wear with which the invention is concerned and the effect of that wear on the plasma jet.
Figure 3B:
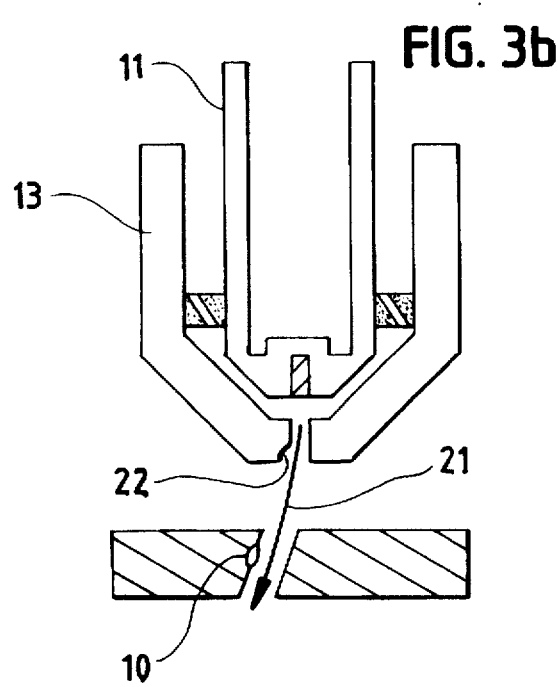

The non-axisymmetric type of erosion with which the invention is concerned is shown in FIGS. 3(a) and (b). Thus prolonged attachment of a pilot arc to the nozzle for example, or double arcing (wherein the arc is established between electrode 11 and nozzle 13, and nozzle 13 and workpiece 5, can erode the nozzle such as to produce a groove 22 therein. This causes deflection of the plasma jet in the direction of the groove (as indicated by arrow A) and shifts the anode spot 10 (that is, the spot where the end or root of the arc is attached onto the workpiece) away from the torch axis in the direction of the plasma jet. As the material melting (cutting) takes place along the plasma jet and since the deflected jet axis does not coincide with the torch axis, the cut angle increases as shown in FIG. 3(b), and varies along the profile resulting in dimensional inaccuracy of the cut parts. Also, the amount of dross at the bottom of the workpiece varies along the part.

Figure 4A:
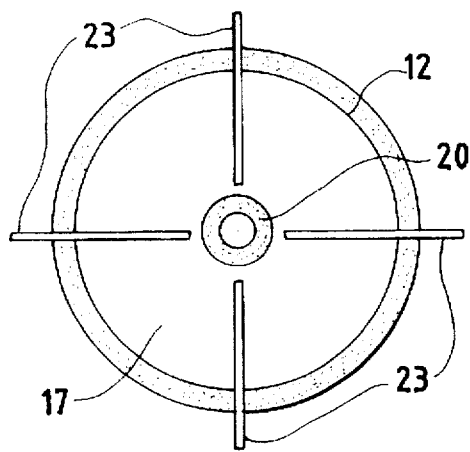
FIGS. 4(a) and (b) and FIG. 5 illustrate respective embodiments of the second aspect of the invention.
Figure 4B:
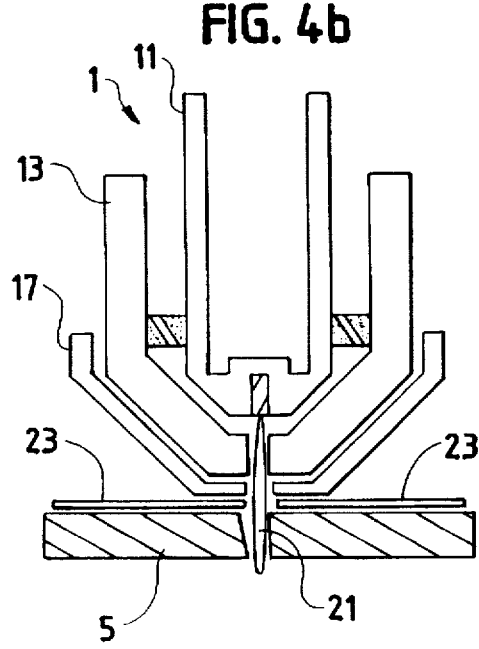

A probe comprising an arrangement of elements for detecting deflection of a plasma jet caused by a groove 22 is shown in FIG. 4. This arrangement comprises a number (for example four) transverse wires 23 arranged symmetrically around the shield orifice 20 between the shield 17 and workpiece 5.

Figure 5A:
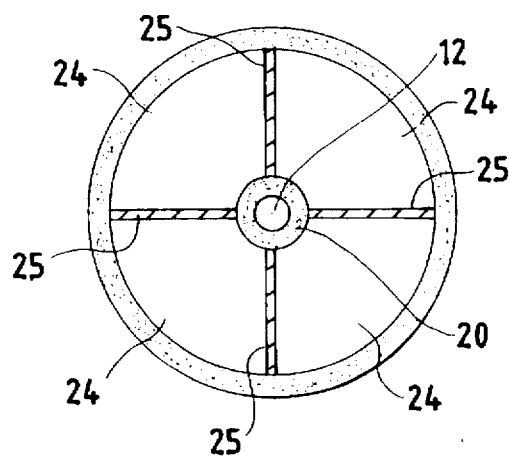
Figure 5B:
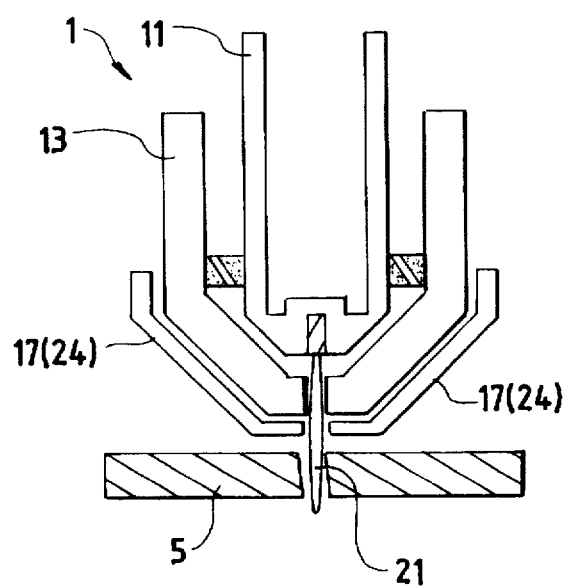

In another implementation, the probe may be formed by segmenting the shield 17. This implementation is shown in FIG. 5 and involves cutting the shield into a number (for example four) segments 24 and electrically isolating the segments by inserting a layer of insulating material 25 between each segment on assembling them to form the shield 17.

Deflections of the plasma jet are detectable by measuring voltages between the nozzle 13 (or electrode 11) and the individual probe wires 23 or shield segments 24 with the arc established between electrode 11 and workpiece 5. Generally, the voltage between nozzle 13 and a probe element 23 or 24 may be referenced as $U_{pni}$ for i=1 ... m where m is the number of probe elements or segments. In FIGS. 4 and 5 for example m=4.

For a nozzle without a groove 22, the voltages $U_{pni}$ are approximately equal, (small differences in these voltages will exist because of imperfections in the torch and probe). However, the presence of a groove 22 on the nozzle 13 will deflect the plasma jet 21 from the torch axis thus decreasing the plasma sheath impedance between the plasma jet 21 and the probe segments 24 (or elements 23) towards which the jet is deflected while increasing the sheath impedance between the jet 21 and the probe segments 24 (or elements 23) which the jet is deflected away from. This results in an increase of the voltages $U_{pni}$ at the segments 24 (or elements 23) which are closer to the jet 21 and in a decrease of $U_{pni}$ at the segments (or elements) which are further from the jet (note that the sheath impedance is non linear).

Figure 6:
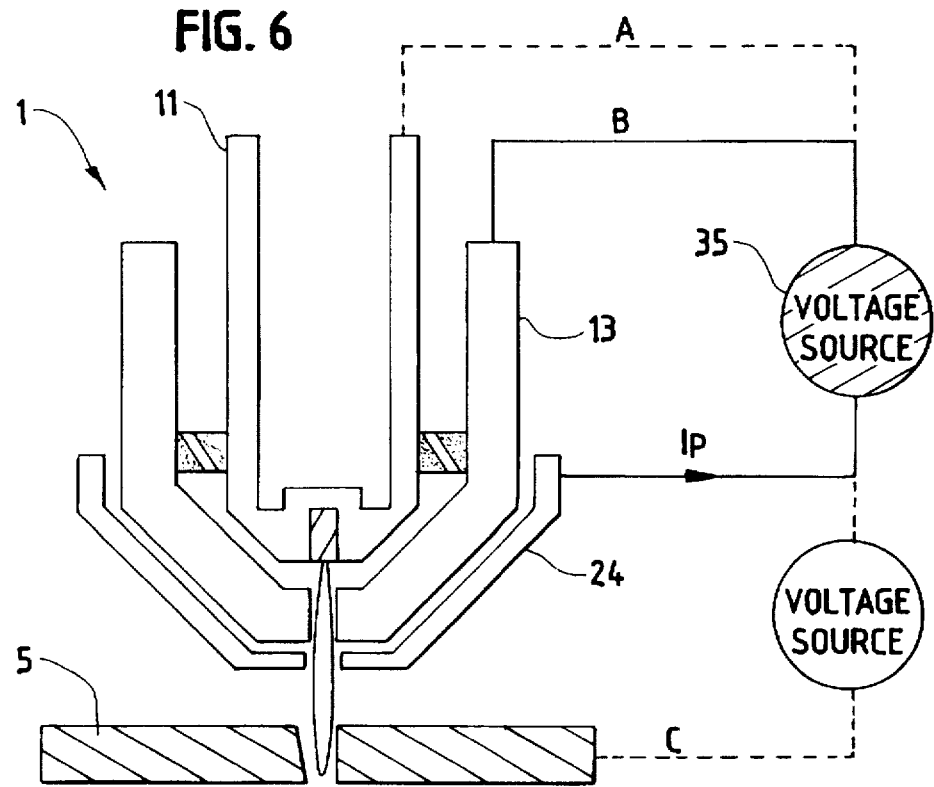
FIGS. 6 to 9 illustrate biasing arrangements for the second aspect of the invention.

Measurement of sheath impedance involves applying a potential difference (for example a Voltage Source 35 as shown in FIG. 6) between the probe (i.e. each segment 24) and an electrode which provides an electrical path: electrode-plasma-probe-electrode, and measuring the current $I_p$ flowing through this path. The above-mentioned electrode can be the torch electrode 11 (connection A in FIG. 6), nozzle 13 (connection B) or the workpiece 5 (connection C). The segmented torch shield 17 is used as the plasma probe in FIG. 6.

Sheath impedance is a non-linear function of the potential difference applied between the electrode and the probe. For example, if the probe is biased positively with respect to the plasma, then free electrons in the plasma will be attracted towards the probe. On the other hand, if the probe is biased negatively with respect to the plasma, then ions will be attracted towards the probe. In the former case the sheath impedance is lower than in the latter case.

Figure 7:
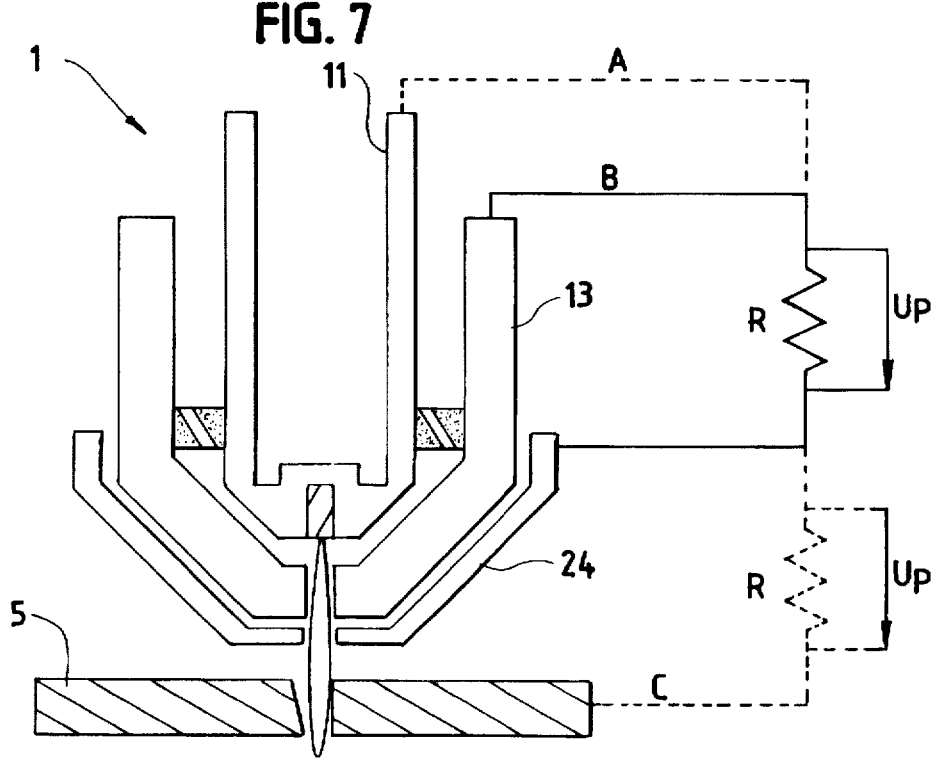

The probe may alternatively be biased using a resistance R (see FIG. 7). The probe potential, $U_p$, depends on the plasma sheath resistance and increases with decreasing plasma to probe distance.

For a probe that is a segmented shield having an even number of segments, e.g. m=4 as shown in FIG. 5, it is possible to detect jet deflection by subtracting the segment voltages associated with the segments located opposite each other. In this arrangement there are three parameters which determine the quality of the method. The first parameter is directional sensitivity. It describes the sensitivity of the difference between the voltages associated with the opposite probe segments to the presence of a nozzle groove with the nozzle groove pointing towards one of these segments. The second parameter is non-directional sensitivity. It describes the sensitivity of the difference between the voltages associated with the opposite probe segments to the presence of a nozzle groove with the nozzle groove normal to these segments. The third parameter is the electrode wear sensitivity. It describes the sensitivity of the difference between the voltages associated with the opposite probe segments with the groove pointing towards one of these segments to the electrode wear.

It is desirable to maximise the ratio of directional sensitivity to non-directional sensitivity, and to minimise the electrode wear sensitivity.

Figure 8:
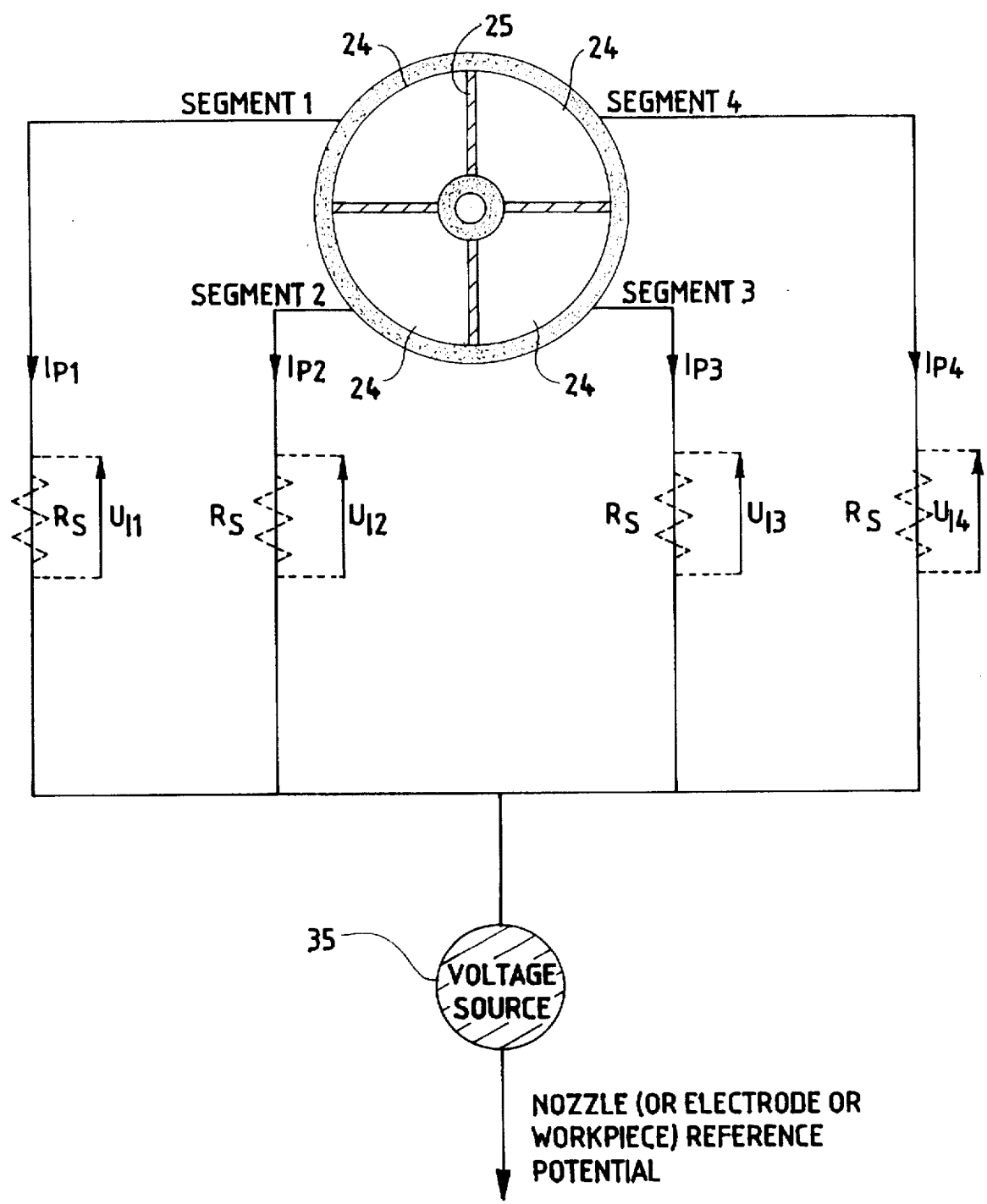
Figure 9:
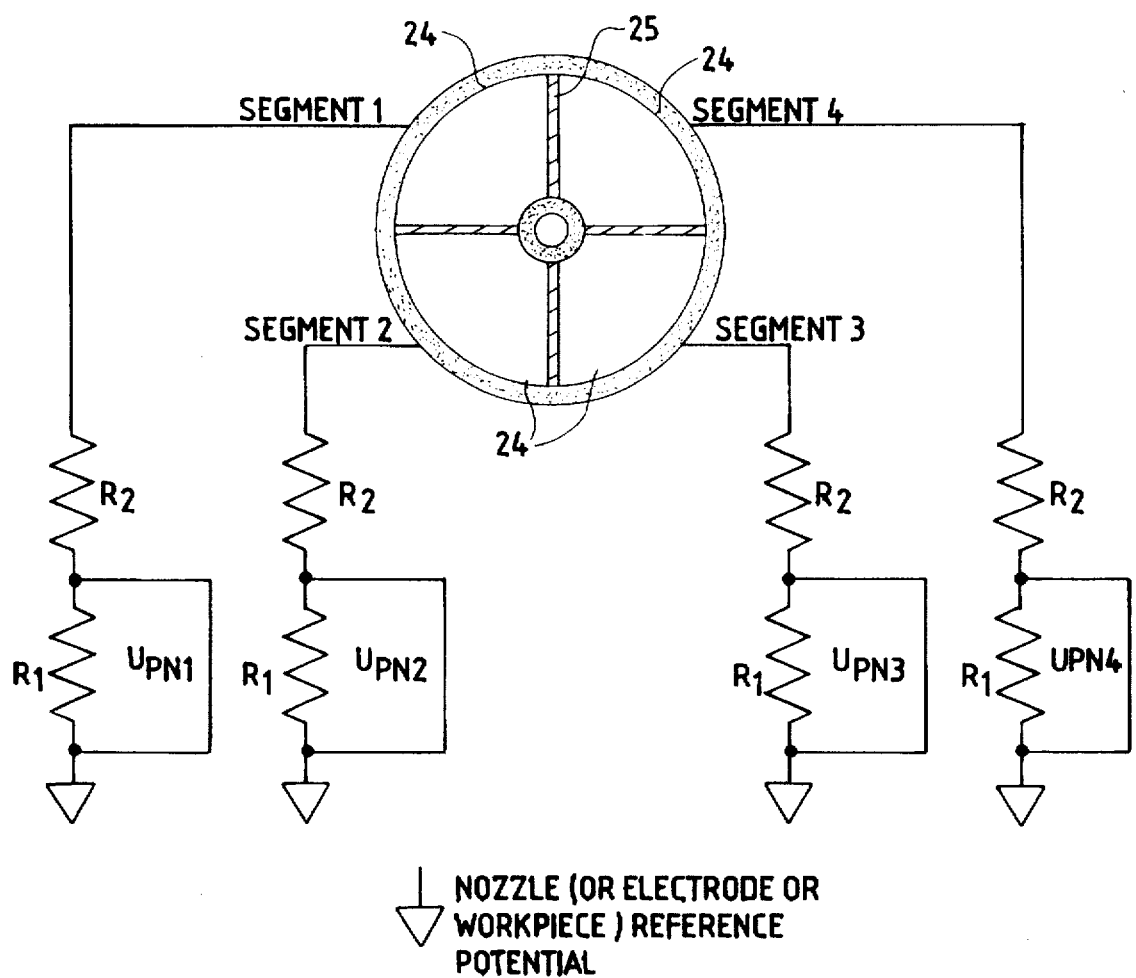

In FIG. 8 a voltage source 35 and probe reference potential are chosen to optimise probe sensitivities. The probe currents, $I_{pi}$, depend on the plasma sheath impedance and increase with decreasing plasma to probe distance. The probe segment currents can be measured for example as voltages $U_{li}$ across shunt resistors $R_s$. The biasing can also be accomplished by a resistive network between the probe segments and the torch electrode, nozzle or the workpiece as shown in FIG. 9. It was found experimentally that for the Hypertherm MAX200 Machine Torch with 100A nozzle and shield probe, the biasing to the nozzle with the resistance of approximately $R_1+R_2=10,000$ $\Omega$ resulted in high ratio of directional sensitivity to non-directional sensitivity and small electrode wear sensitivity. In order to scale the electrode to probe segment voltage down, the voltage divider arrangement shown in FIG. 9 was used with $R_1=200$ $\Omega$ and $R_2=9,100$ $\Omega$.

Figure 10:
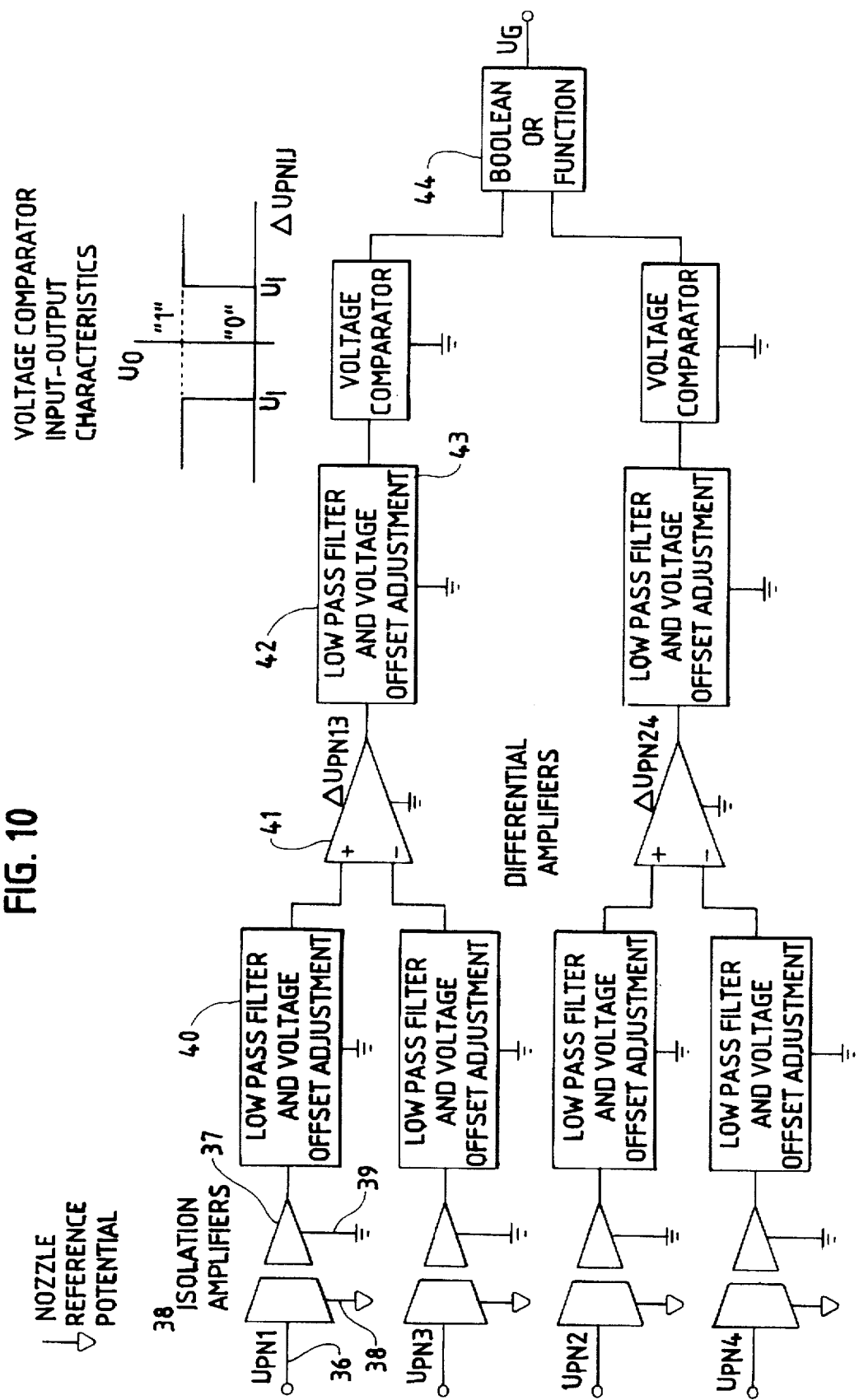
FIG. 10 illustrates an apparatus set-up for detecting non-axisymmetric wear according to the first or second aspects of the invention.

A functional diagram of a measurement apparatus for the detection of non-axisymmetric nozzle wear by detection of plasma jet deflection is shown in FIG. 10. This apparatus is suitable for a probe with four elements. The symbol $U_{pni}$ denotes the voltage between the nozzle and the i-th segment of the probe.

The voltages $U_{pni}$ are the input signals 36 to the measurement apparatus as shown in FIG. 10. The voltage inputs of the apparatus are electrically isolated from the rest of the apparatus by the isolation amplifiers 37. The reference potential 38 of the input stage of the isolation amplifiers is that of the nozzle 13 (or the torch electrode 11 or the workpiece 5). The reference potential of the output stage of the isolation amplifiers is that of the rest of the measurement apparatus and can be grounded as indicated at 39. The isolation amplifiers 37 are followed by optional low pass filters (e.g. third order Bessel filters with the cutoff frequency of 5 Hz) and voltage offset adjustment circuits 40. Differential amplifiers 41 are used to obtain the differences between voltages at the opposite segments of the probe (e.g. for i=4, $\Delta U_{pn13}=U_{pn1}-U_{pn3}$ and $\Delta U_{pn24}=U_{pn2}-U_{pn4}$ where segments 1,2,3 and 4 are shown in FIG. 9). An optional low pass filter and voltage offset adjustment stage 42 precedes a voltage comparator stage 43. The voltage comparators' input-output characteristic is also depicted in FIG. 10. If $\Delta U_{pnij}<-U_t$ or $\Delta U_{pnij}>U_t$ then there is a groove pointing towards either segment i or j of the probe. For example, if a sufficiently large groove points towards segment 1 of the segmented probe shown in FIG. 9, then the output of the comparator 43 with the $\Delta U_{pn13}$ input is in a high state (logical "1" or "true") and that of the comparator 43 with the $\Delta U_{pn24}$ input is in a low state (logical "0" or "false"); on the other hand, if a sufficiently large groove points in between segments 2 and 3, then the outputs of both comparators are high ($\Delta U_{pn13}<-U_t$ and $\Delta U_{pn24}>U_t$). The value of $U_t$ has to be determined experimentally for a given torch type and for the cut quality considered to be unsatisfactory. The Boolean OR function 44 produces high output $U_g$ if at least one output from the voltage comparators 43 is high indicating the presence of nozzle erosion of type (i). The degree of wear is indicated by the magnitude of the voltage $\Delta U_{pnij}$.

Figure 11:
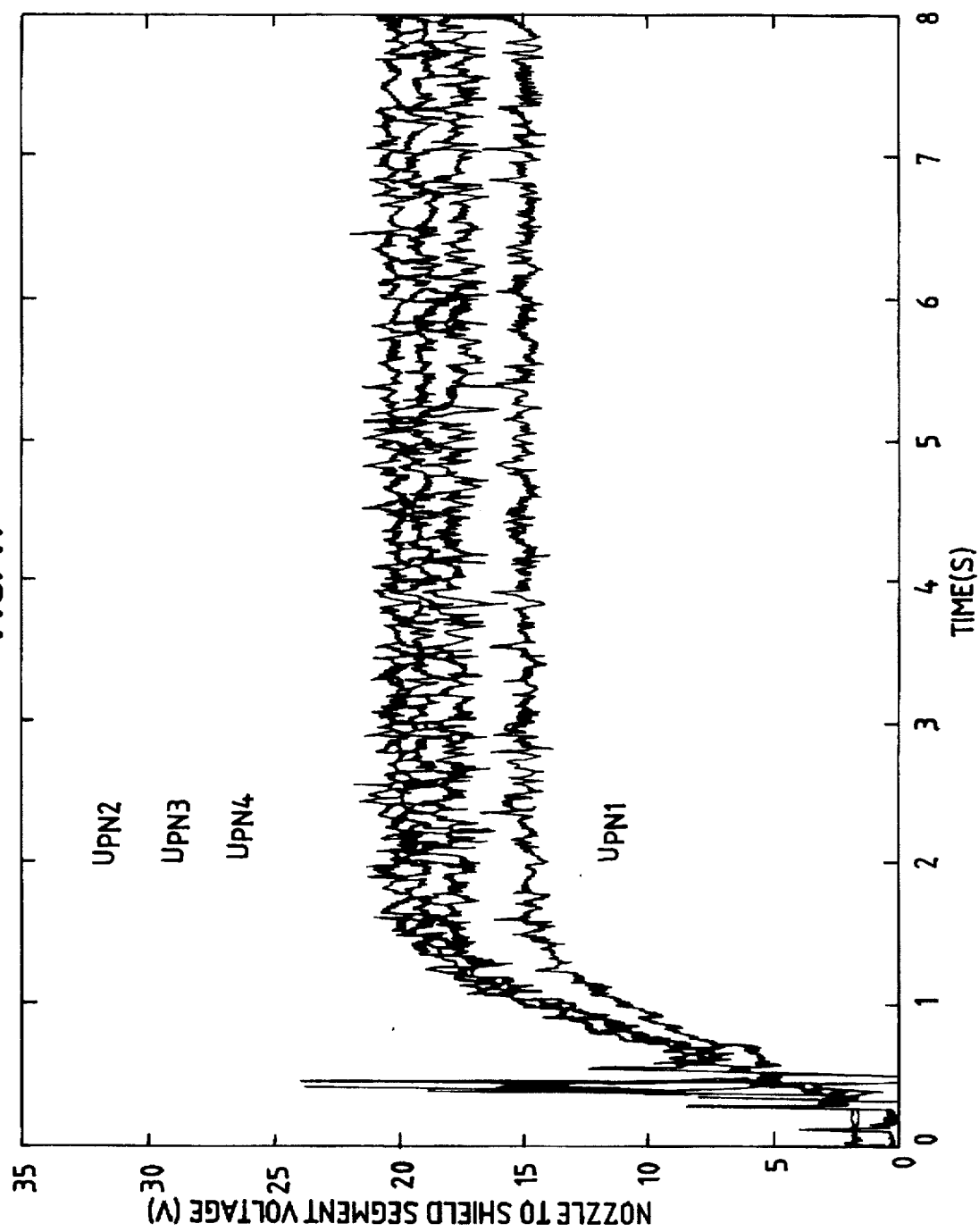
FIGS. 11, 12 and 13 are graphs illustrative of the first aspect of the invention.
Figure 12:
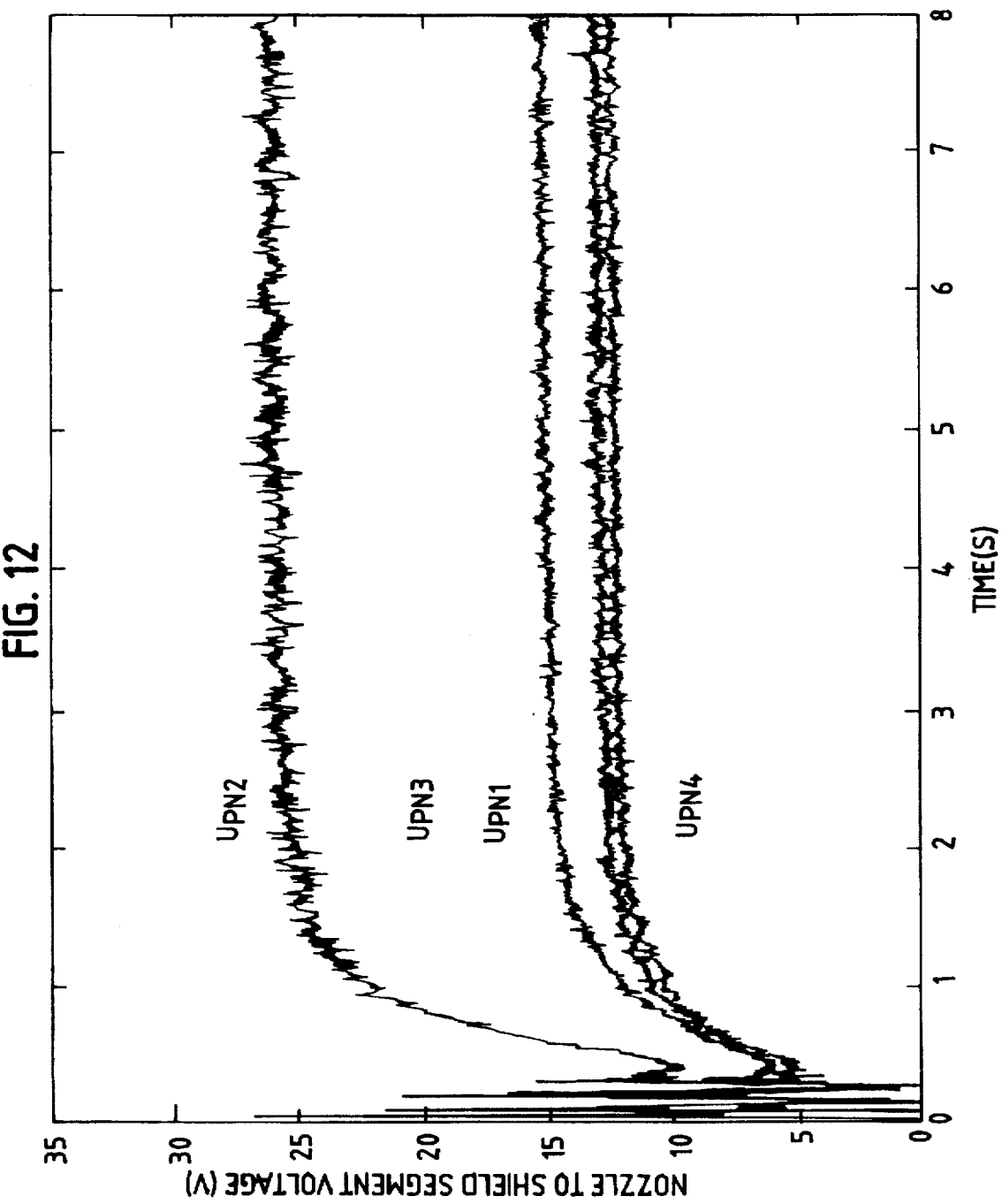
Figure 13:
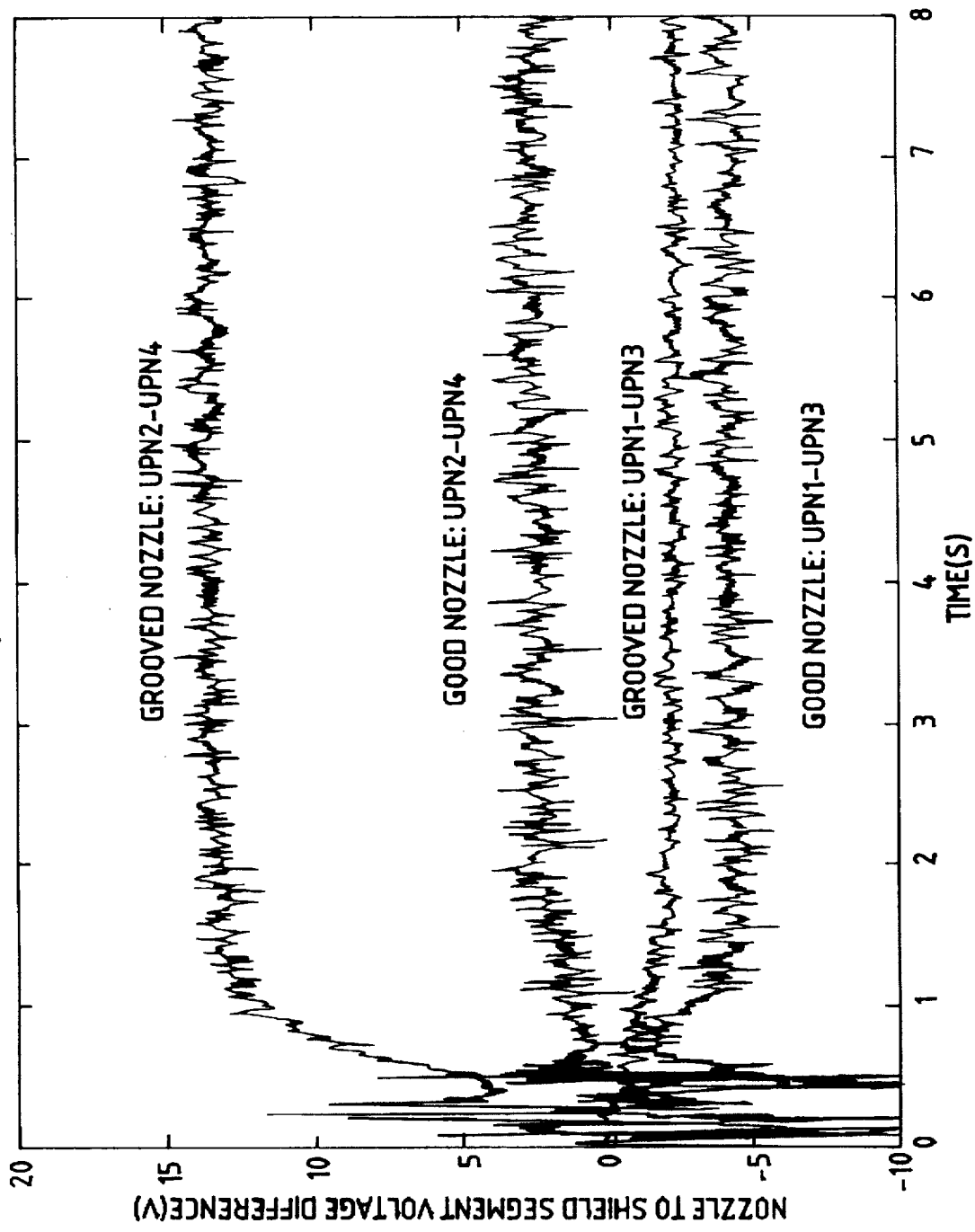

The voltages measured at four segments 24 of a shield 17 with a good nozzle 13 are shown in FIG. 11 and those measured with a nozzle having a groove 22 pointing towards segment 2 are depicted in FIG. 12. It can be seen that voltage $U_{pn2}$ increased while $U_{pn4}$ decreased in comparison with those voltages corresponding to the case with a good nozzle. Nozzle wear of type (i), that is non-axisymmetric wear, can be detected by comparing the differences between voltages measured at the opposite segments of the probe, that is, $\Delta U_{pn13}=U_{pn1}-U_{pn3}$ and $\Delta U_{pn24}=U_{pn2}-U_{pn4}$, to the threshold values of these differences corresponding to a good nozzle. The differences $\Delta U_{pn13}$ and $\Delta U_{pn24}$ are shown in FIG. 13.

The above described method of detection of nozzle wear of type (i) is suitable for on-line, i.e. during a cutting operation, torch condition monitoring. It should also be suitable for detecting double arcing in that double arcing will cause deflection of the arc.

According to a further aspect of the invention, non-axisymmetric nozzle erosion may be detected by measuring the voltage between electrode 11 and a workpiece 5, $U_{we}$, during a cutting operation. This voltage is approximately constant under steady state conditions because the anode root attachment tends to lie on the plasma jet axis for sufficiently high gas flow. However, if the orientation of a nozzle groove 22 with respect to the cutting direction changes, then the orientation of the deflected plasma jet with respect to the cutting direction and consequently the cut angle along the part, changes. Also, the anode root attachment moves within the cutting front when the plasma jet orientation changes. This affects the effective arc length which, in turn, results in variations in $U_{we}$. However, if the nozzle is free of non-axisymmetric erosion, then no or very little variation can be detected in $U_{we}$.

Figure 14:
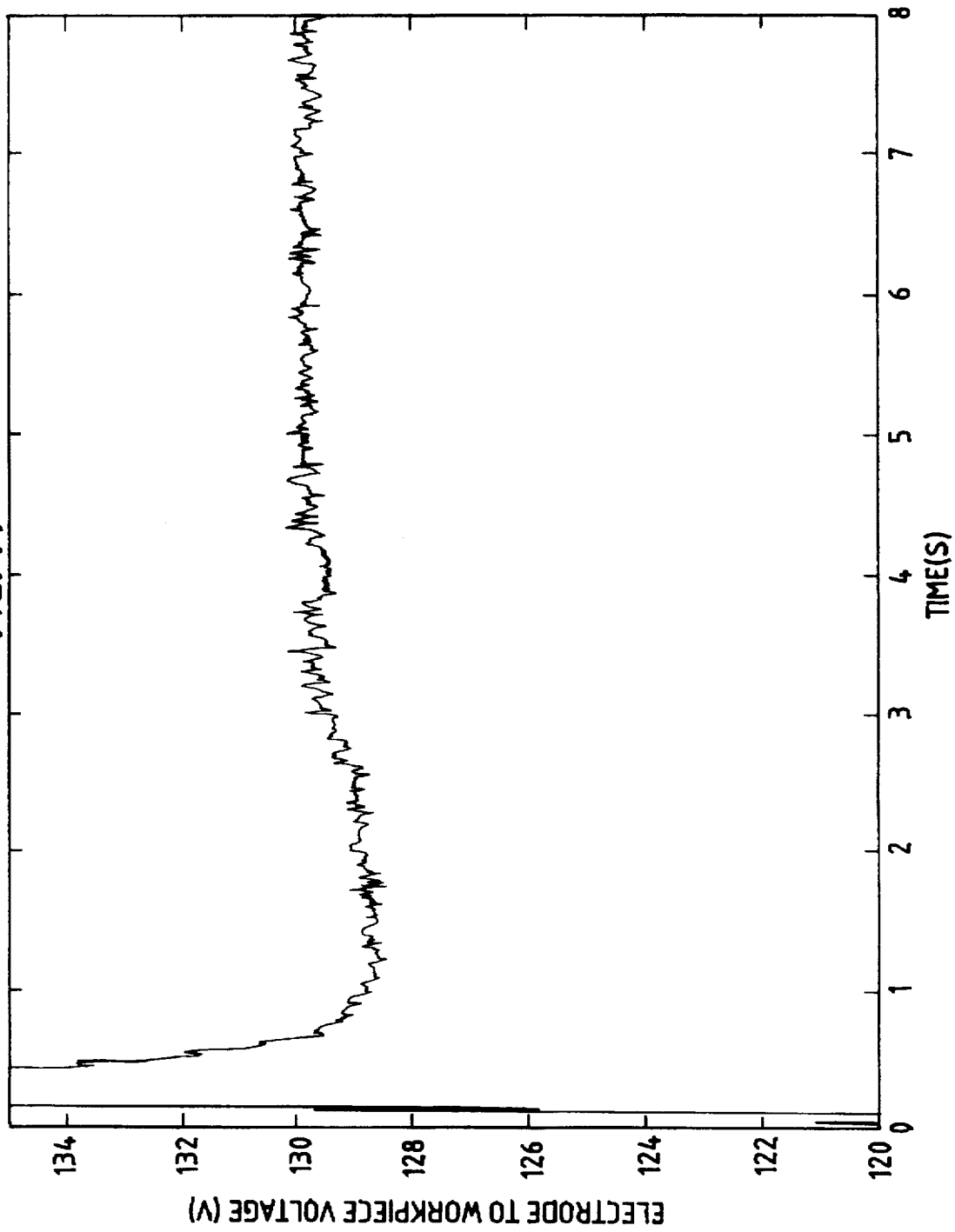
FIGS. 14 and 15 are graphs illustrative of the third aspect of the invention.
Figure 15:
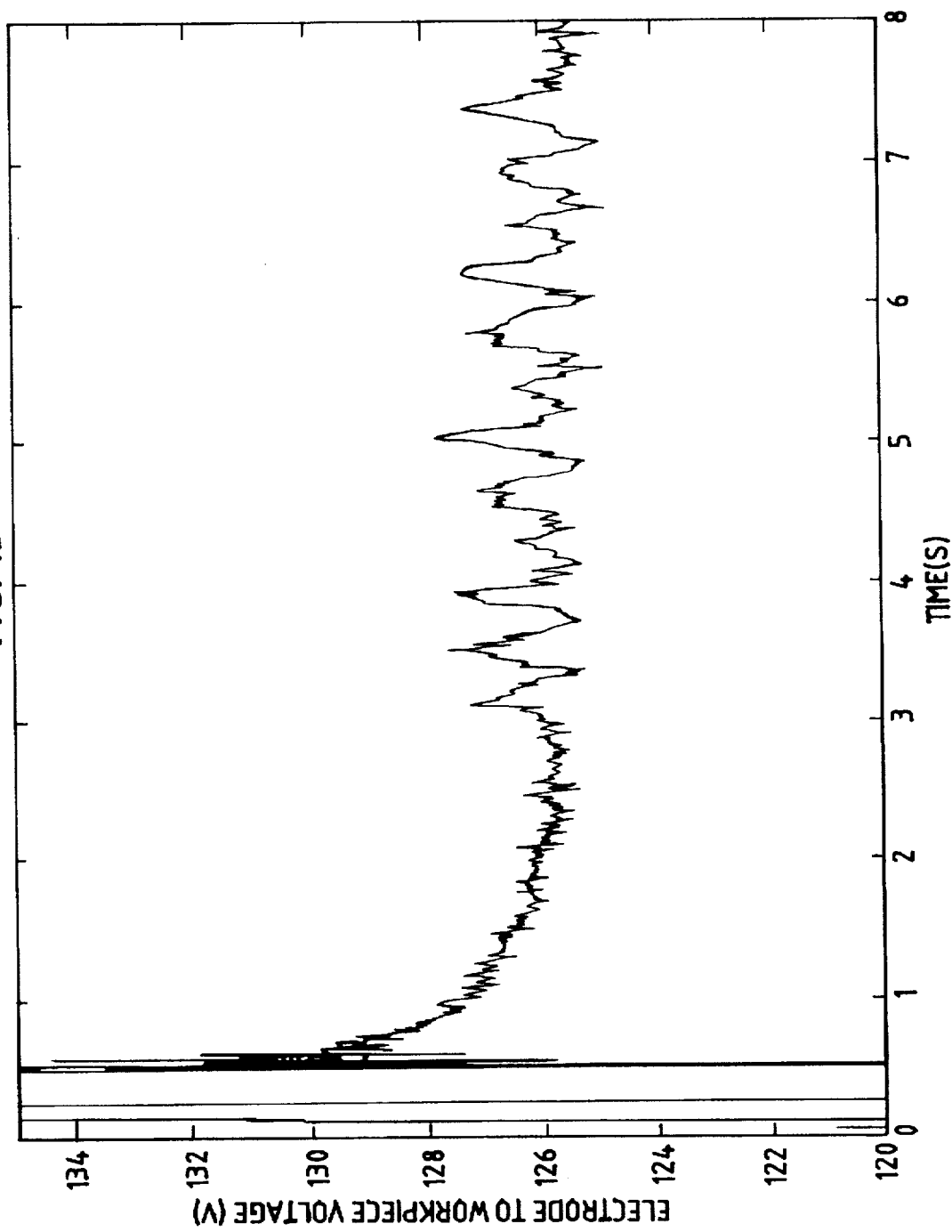
Figure 16:
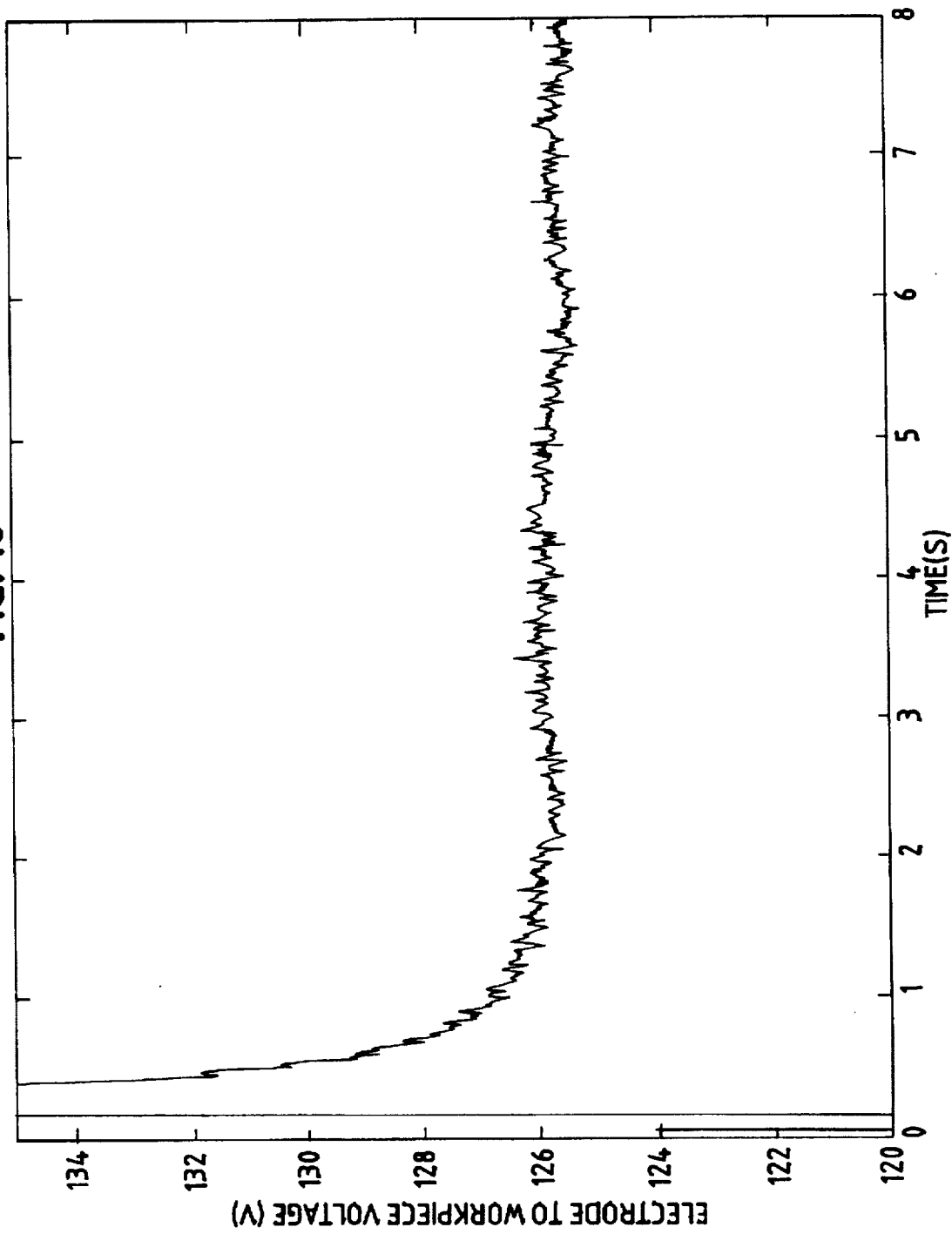
FIGS. 16 and 17 are graphs illustrative of the third aspect of the invention.
Figure 17:
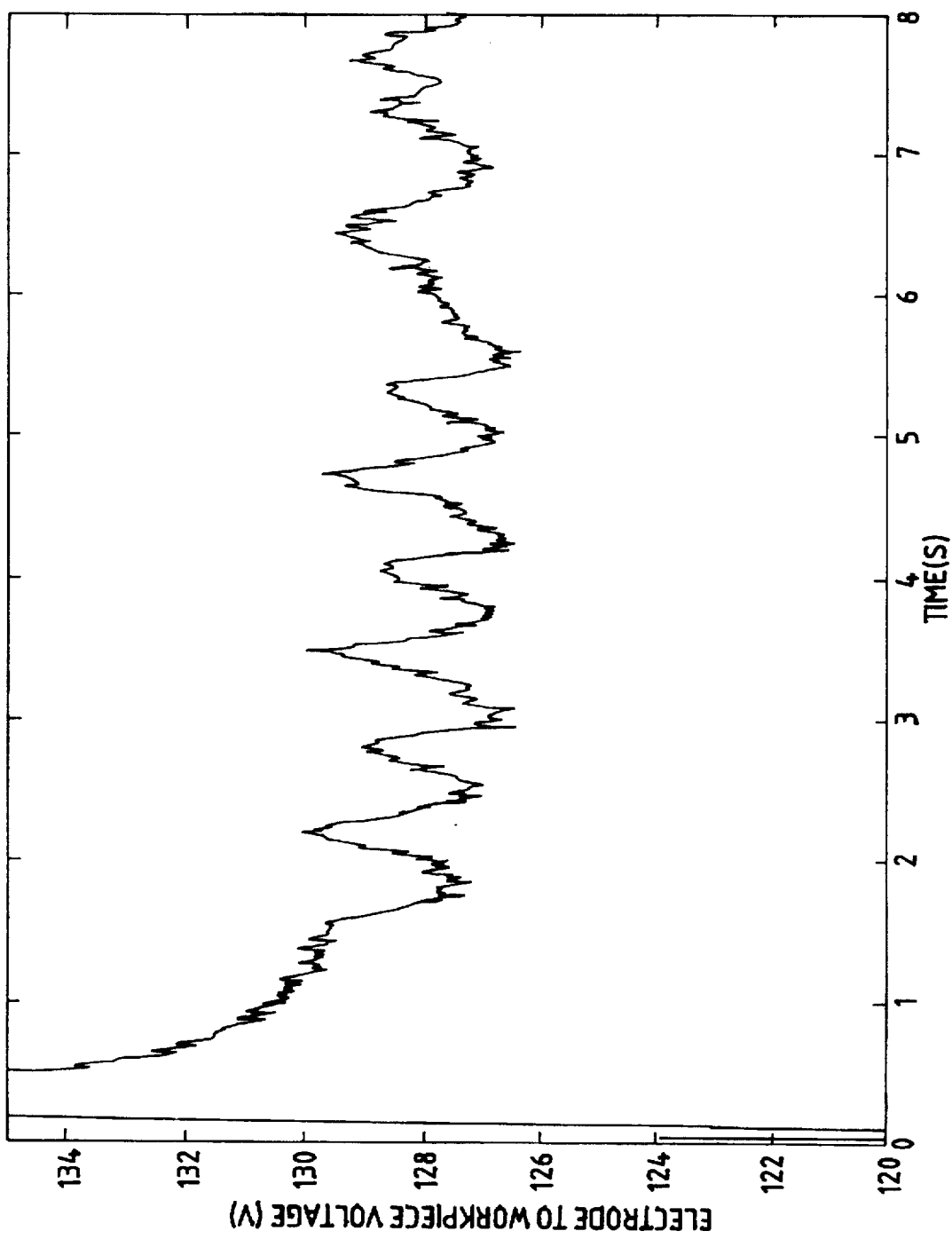

The measurement of $U_{we}$ for the purpose of detection of non-axisymmetric wear can be performed during any operation which involves changing the orientation of the nozzle with respect to the cutting direction. For example, the torch (or the nozzle) can be rotated around its axis during cutting or the torch may traverse an appropriate profile, for example a circle or a profile consisting of semi-circles. The electrode to workpiece voltages for a good and grooved nozzle resulting from turning a torch from 0 to 180 degrees and back to 0 degrees while cutting a straight line are shown in FIGS. 14 and 15 respectively. The voltages obtained while traversing a profile consisting of S-shapes with a good and grooved nozzle are depicted in FIGS. 16 and 17 respectively. The amplitude of the oscillations in $U_{we}$ has to be determined and compared with a threshold value corresponding to the amplitude associated with a good nozzle; if the amplitude is greater than the threshold value then the nozzle has non-axisymmetric erosion, that is, grooves such as 22. This method of detection of nozzle wear of type (i) is suitable for on-line as well as off-line implementation.

The electrode to workpiece voltage variations can be amplified if the arc is attached to a bevelled surface of a workpiece and no material penetration takes place. In this case the arc root attachment moves up and down the bevelled surface when the orientation of the groove changes.

Figure 18A:
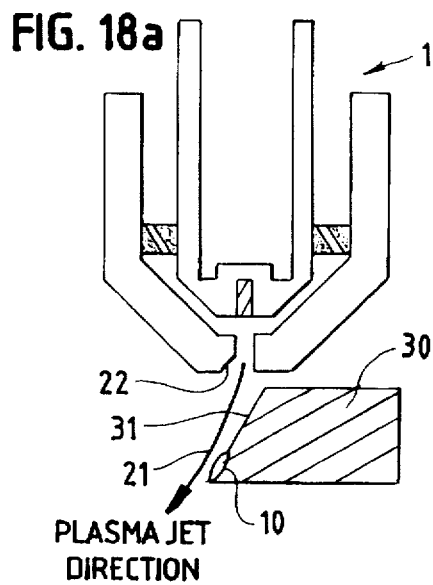
FIGS. 18(a) and (b) and 19(a) to (d) illustrate the fourth aspect of the invention.
Figure 18B:
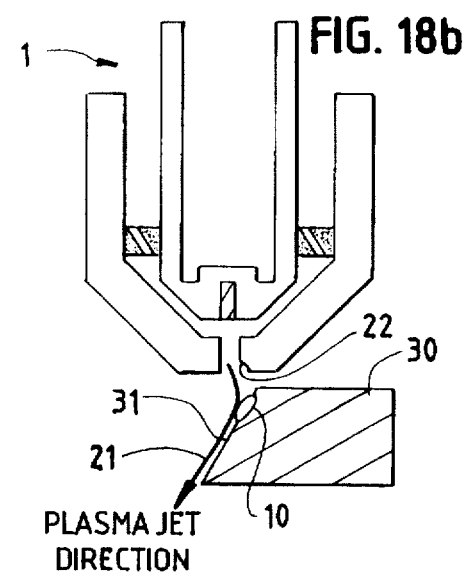
Figure 19A:
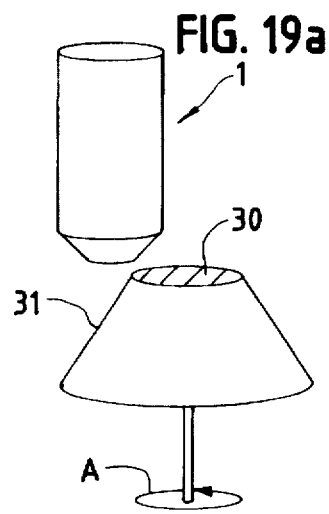
Figure 19B:
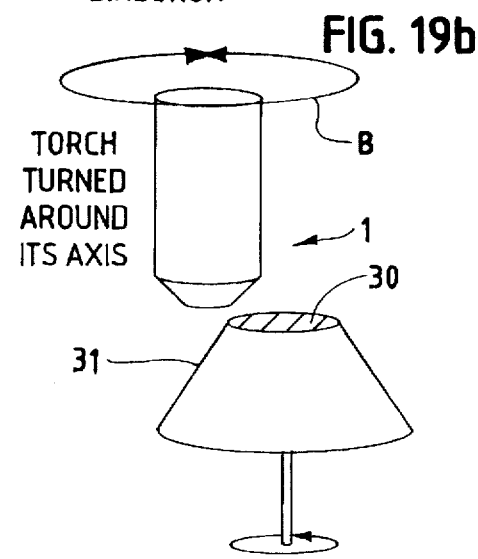
Figure 19C:
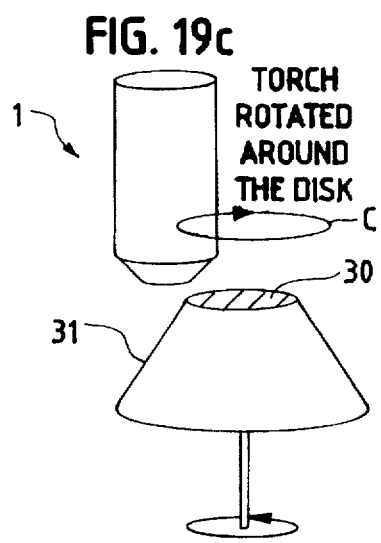
Figure 19D:
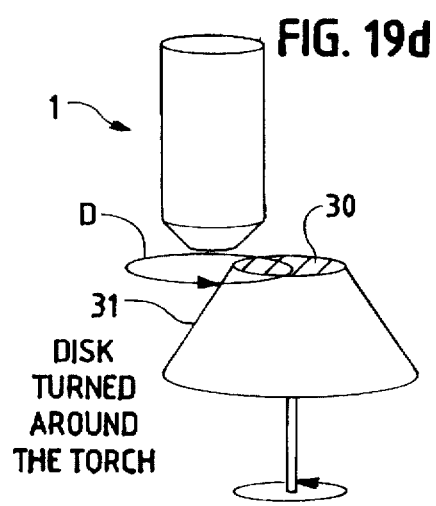
Figure 20:
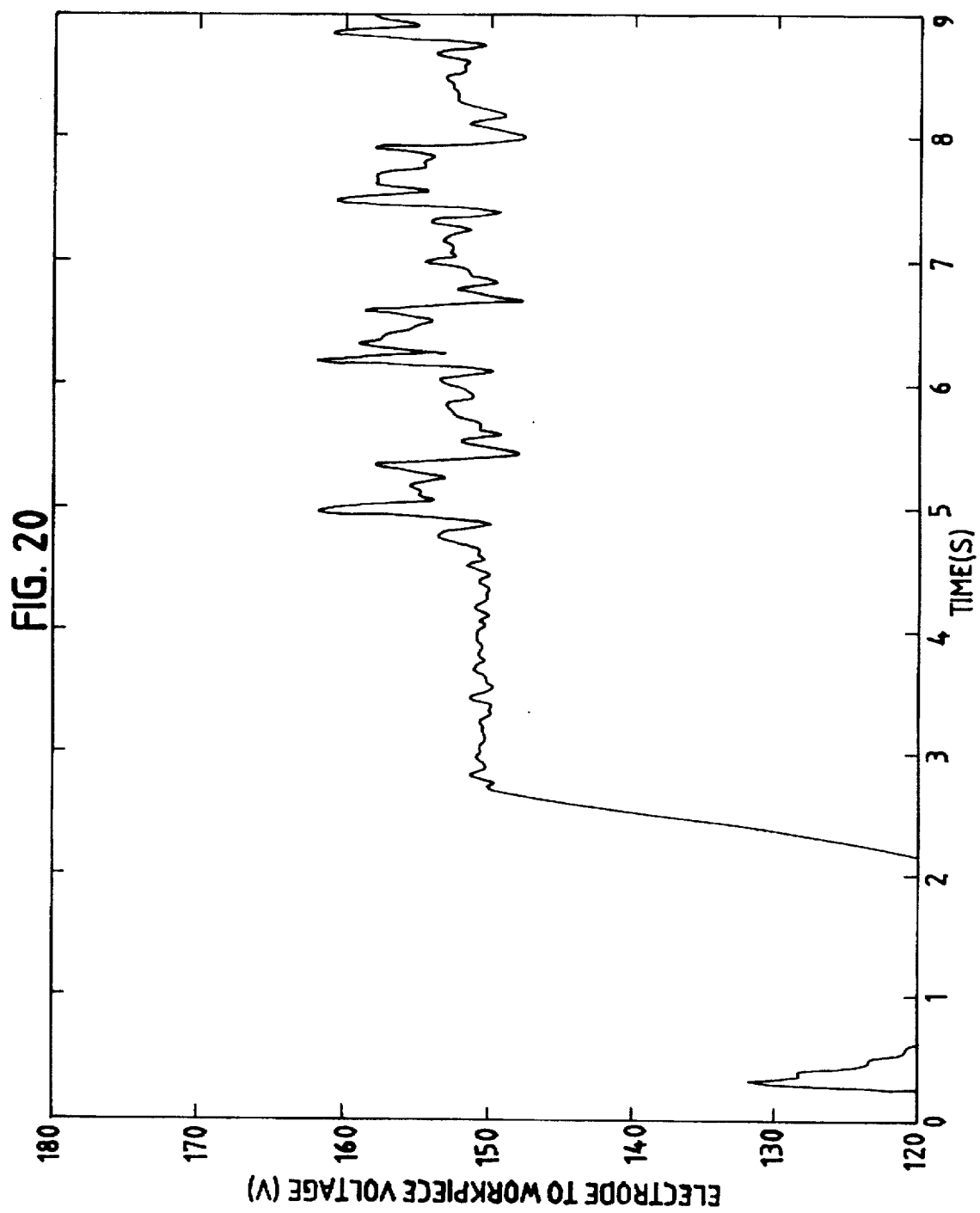
FIGS. 20 to 23 are graphs illustrative of the fourth aspect of the invention.
Figure 21:
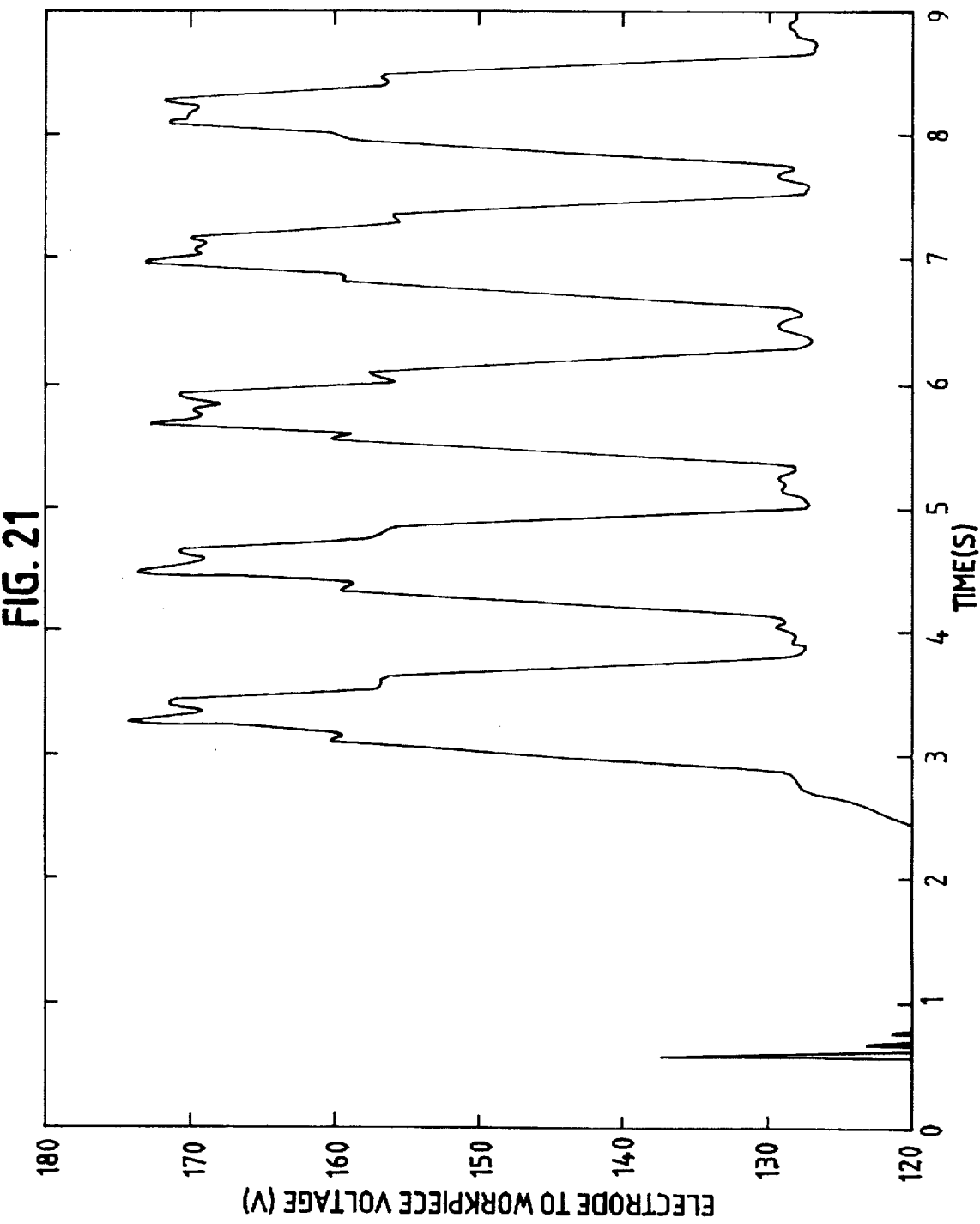
Figure 22:
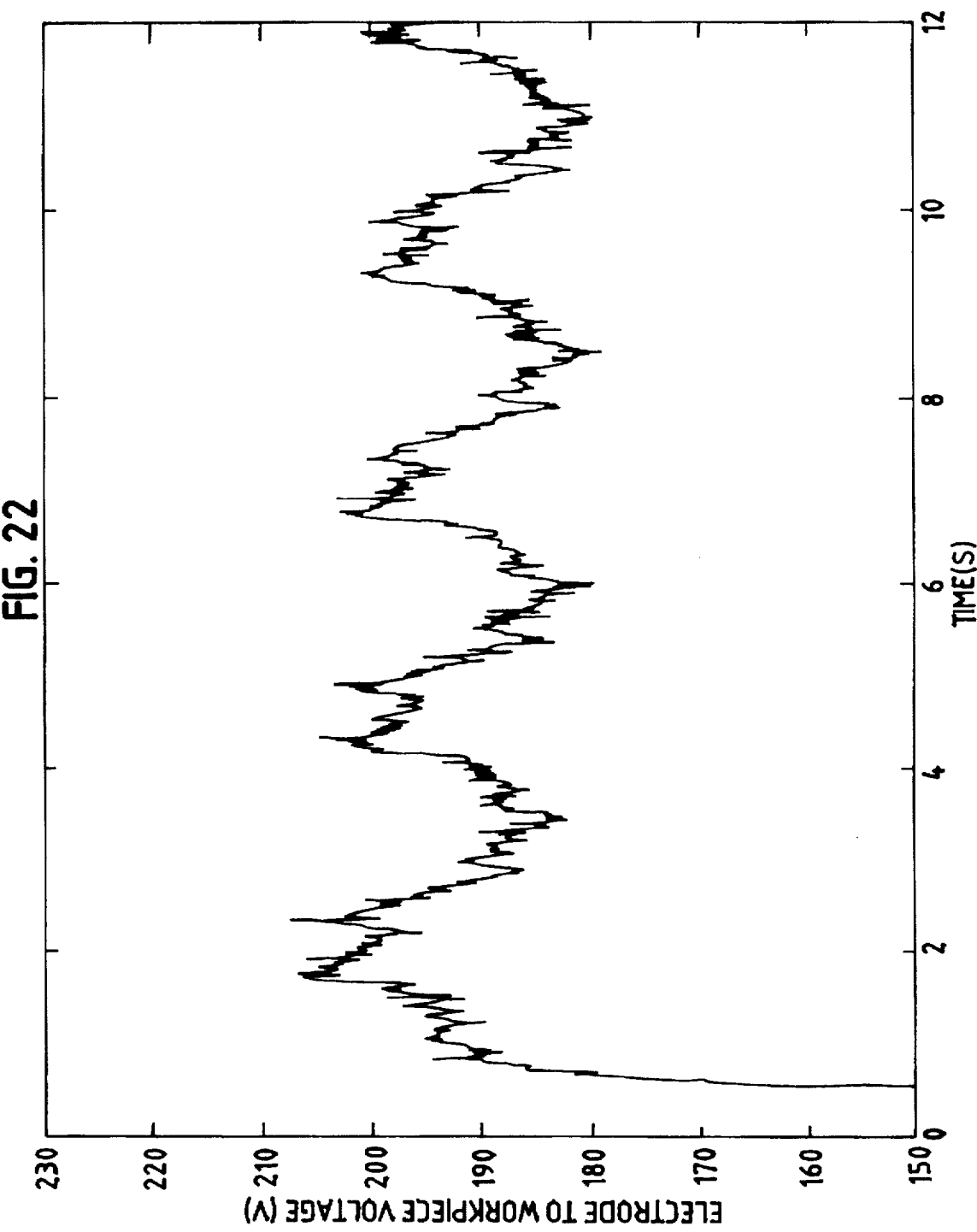
Figure 23:
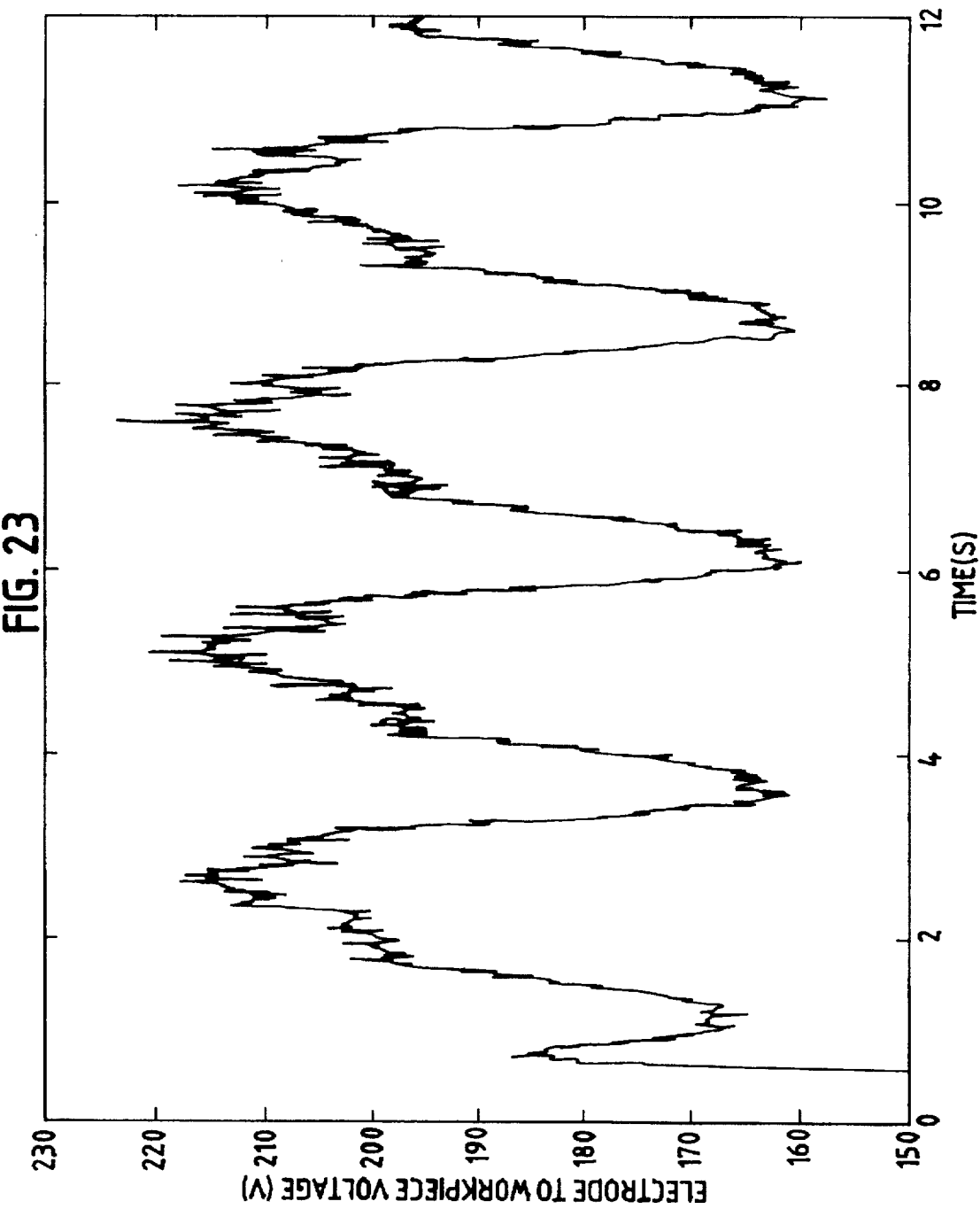

Thus, as shown in FIGS. 18 and 19, a frustroconical electrode (termed hereinafter workpiece or disc) 30 may be provided which is rotatably mounted relative to a torch 1 to provide a sloping surface 31 for attachment of the arc root 10. As shown in FIGS. 18(a) and (b) the anode spot 10 moves along the bevelled surface 31 on relative rotation between that surface and the torch 1 (as indicated by the different position of groove 22 in FIG. 18(a) compared to FIG. 18(b)). This means that the amplitude of the voltage oscillations is several times greater than that obtained with flat and penetrated workpieces because the changes in the effective arc length are greater. The non-penetrable workpiece 30 can be, for example, a water cooled, bevelled copper disc rotating at a sufficiently high speed in order to avoid material penetration (as shown by arrow A in FIG. 19a). The torch 1 can be turned by 180° (for example ±90 degrees) around its own axis as shown by arrow B in FIG. 19b, or the torch 1 can be rotated around the disc axis of rotation as depicted by arrow C in FIG. 19c, or the disc can be rotated around the torch axis as shown by arrow D in FIG. 19d. The electrode to workpiece voltages obtained with the torch 1 turned by ±90 degrees around its axis, as shown in FIG. 19b, are depicted in FIGS. 20 and 21 for a good and grooved nozzle respectively. Similarly, the electrode to workpiece voltages obtained with the disc 30 rotated around the torch axis as shown in FIG. 19d, are depicted in FIGS. 22 and 23 for a good and grooved nozzle respectively. The oscillations observed for the good nozzle (see FIG. 22) result from backlash present in servo-drives of an x-y table used to rotate the disc 30 around the torch 1. The amplitude of the oscillations in $U_{we}$ has to be determined and compared with a threshold value corresponding to the amplitude associated with a good nozzle, if the amplitude is greater than the threshold value then the nozzle 13 has non-axisymmetric erosion. This method of detection of nozzle wear is suitable for off-line implementation.

A functional diagram of a measurement apparatus for the detection of the nozzle wear of type (i) by detection of change in arc length is shown in FIG. 24(b).

The torch electrode to workpiece voltage can be scaled down by a resistor voltage divider as shown in FIG. 24(a) ($R_3$=200 Ω and $R_4$=10,000 Ω). The electrode to workpiece voltage ($U_{we}$) input 45 of the apparatus (see FIG. 24(b)) is electrically isolated from the rest of the apparatus by an isolation amplifier 46. The reference potential 47 of the input stage of the isolation amplifier 46 is that of the electrode 11. The reference potential of the output stage of the isolation amplifier is that of the rest of the measurement apparatus and can be grounded as indicated at 48. The isolation amplifier 46 is followed by an optional low pass filter (e.g. third order Bessel filter with the cutoff frequency of 5 Hz) and voltage offset adjustment circuit 49. A voltage peak-to-peak detector module 50, connected to the output of circuit 49, detects the peak-to-peak amplitude of the electrode to workpiece voltage $U_{we}$ oscillations resulting from the change in arc length. This amplitude is compared with a threshold value, $U_t$ (comparator 51); if the amplitude is greater than $U_t$ then the output of the voltage comparator 51, $U_{weA}$, indicates presence of the non-axisymmetric nozzle wear.

Experiments for the results given herein were conducted using a Hypertherm MAX200 Plasma Arc Cutting System with Machine Torch having components (nozzle, electrode, shield and swirl ring) for 100A current and air plasma and air shield gas. The measurements were performed for 100A current, 24 psi preflow plasma gas (air) pressure and 60 psi preflow shield gas (air) pressure. 6 mm thick, mild steel plate was cut at a cutting speed of 50 mm/s and with 3 mm torch to workpiece distance.

Figure 25:
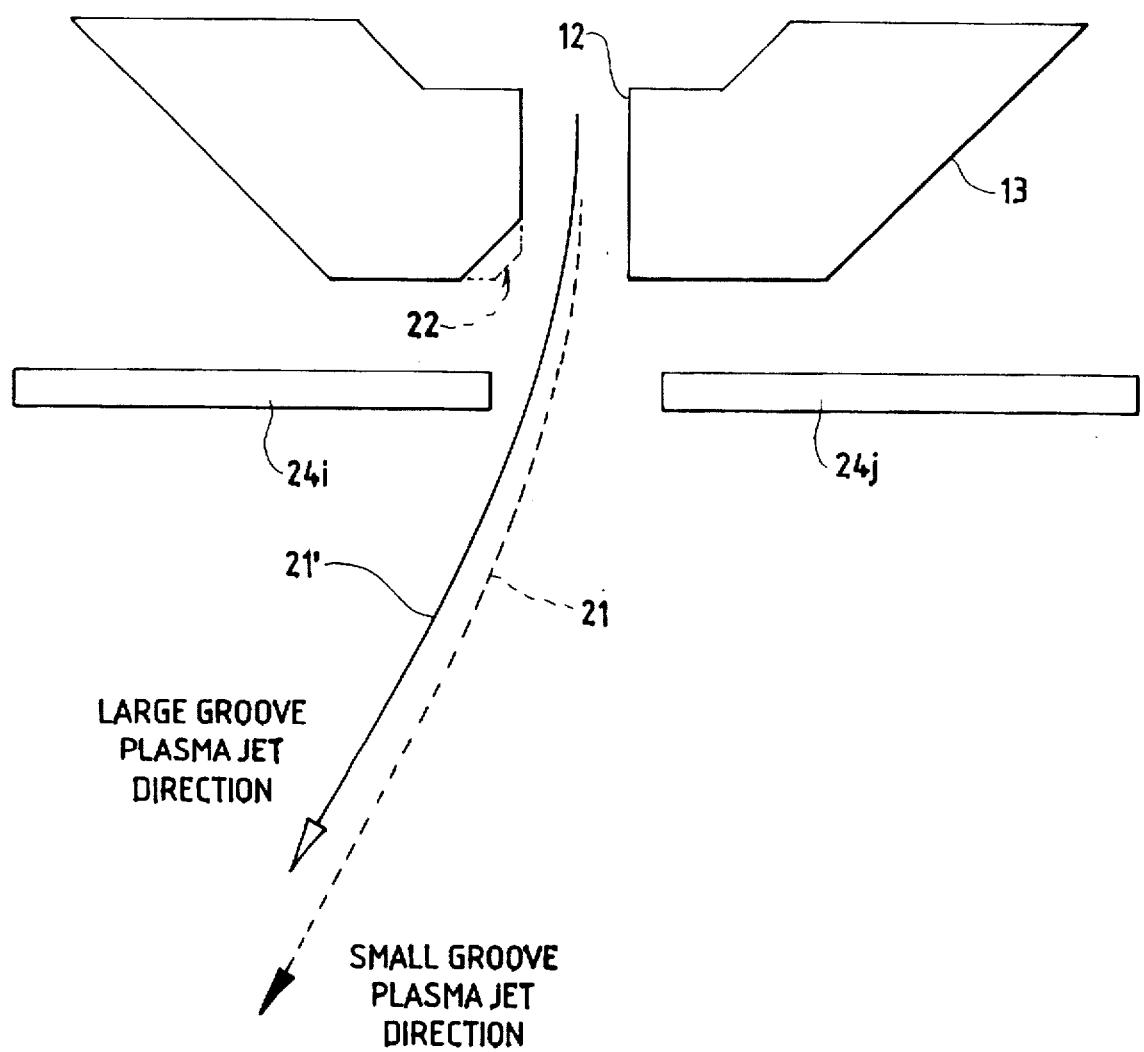
FIGS. 25 and 27(a) and (b) illustrate how different degrees of non-axisymmetric wear influence a plasma jet.
Figure 26:
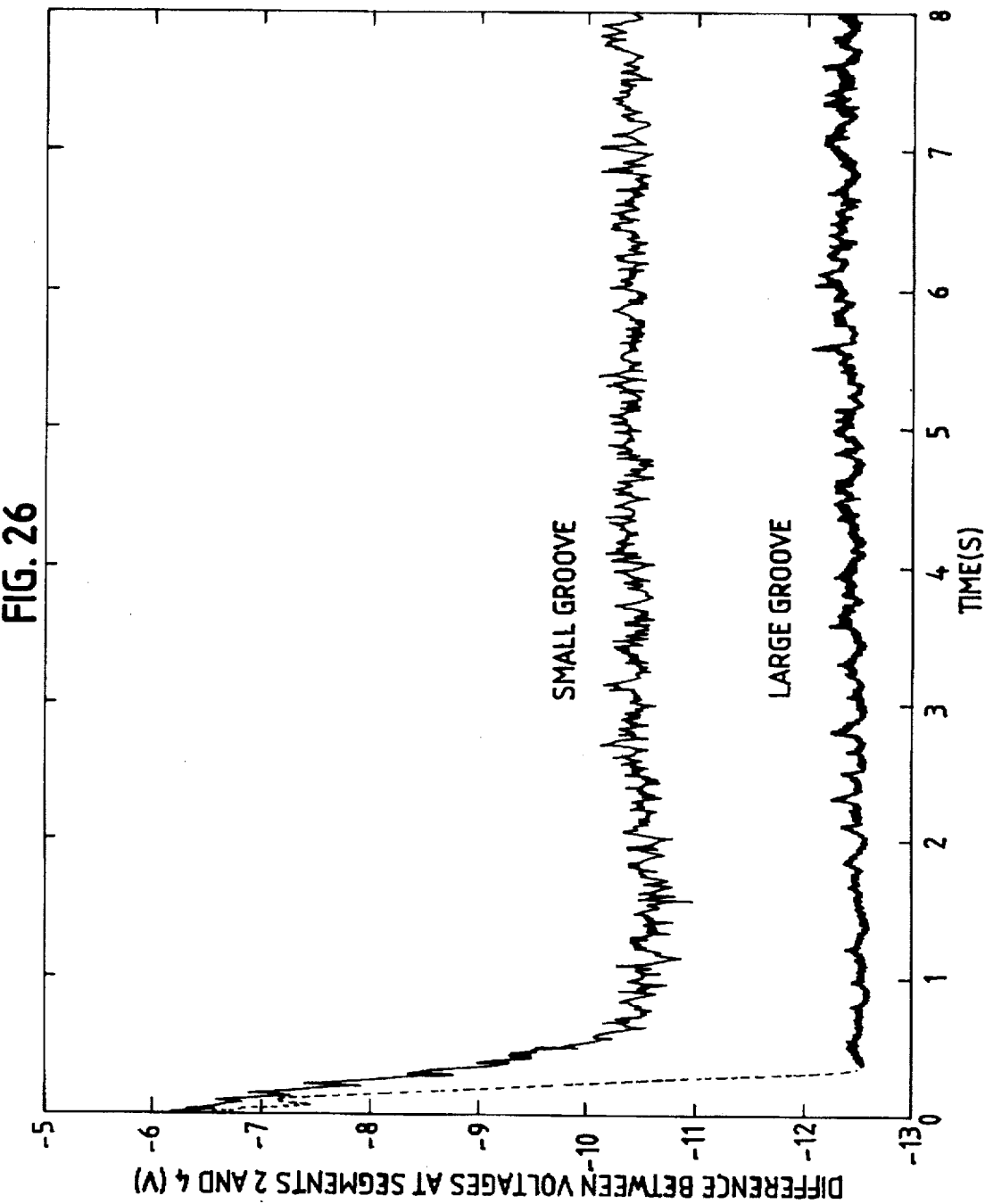
FIGS. 26 and 28 are graphs illustrative of the effects of different degrees of non-axisymmetric wear on an electrical parameter associated with the plasma jet.

In the first and second aspects of the invention the degree of non-axisymmetric wear of a nozzle can be measured in that the plasma jet is deflected higher in the nozzle orifice with an increasing degree of nozzle erosion. This means that the plasma jet passes closer to the probe element towards which the jet is deflected with the increasing degree of nozzle erosion (see FIG. 25). The probe potential at the probe segment 24 towards which the jet 21 is deflected (Probe segment 24i in FIG. 25) increases while the probe potential at the probe segment 24 away from which the jet 21 is deflected (Probe segment 24j in FIG. 25) decreases with the increasing degree of wear. This is illustrated in FIG. 26 depicting the differences between the voltages measured with respect to the torch electrode 13 at opposite segments (segments 2 and 4 of a shield probe with 4 segments with the groove 22 pointing towards segment 4) for a small and large groove (as indicated by lines 21 and 21', respectively, in FIG. 25).

Figure 27A:
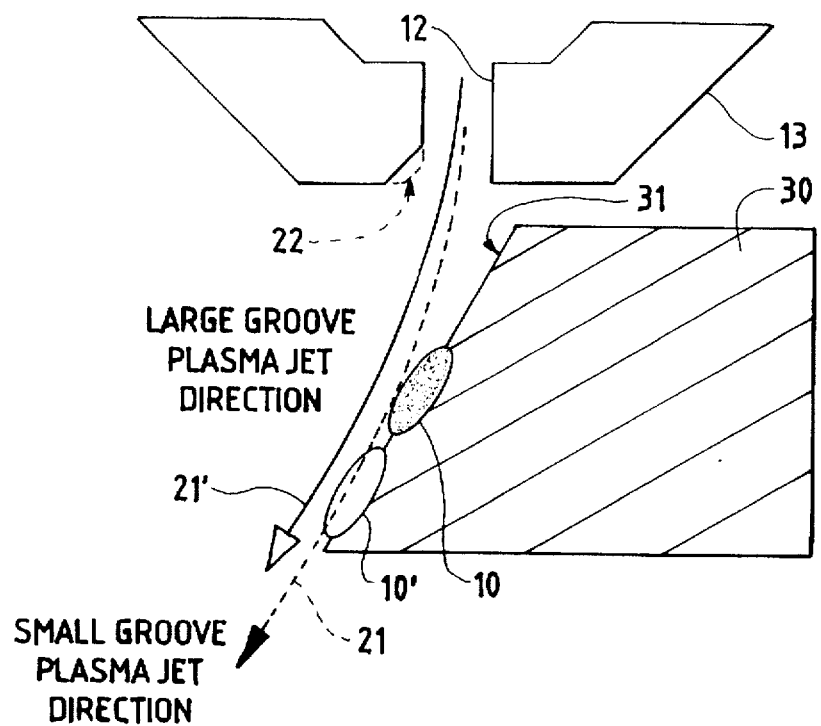
Figure 27B:
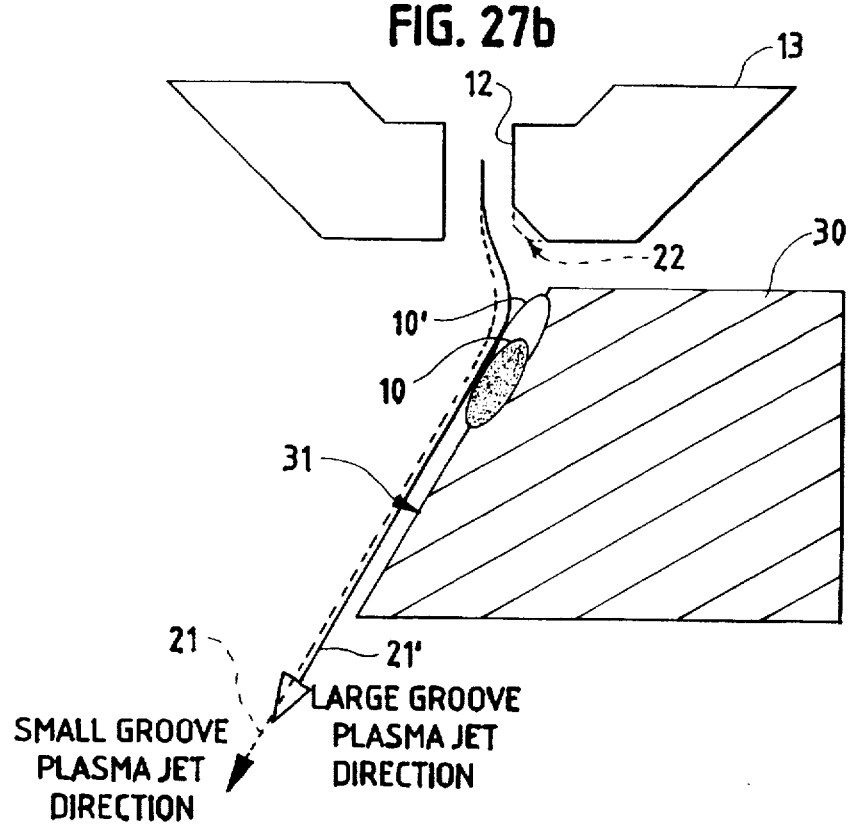
Figure 28:
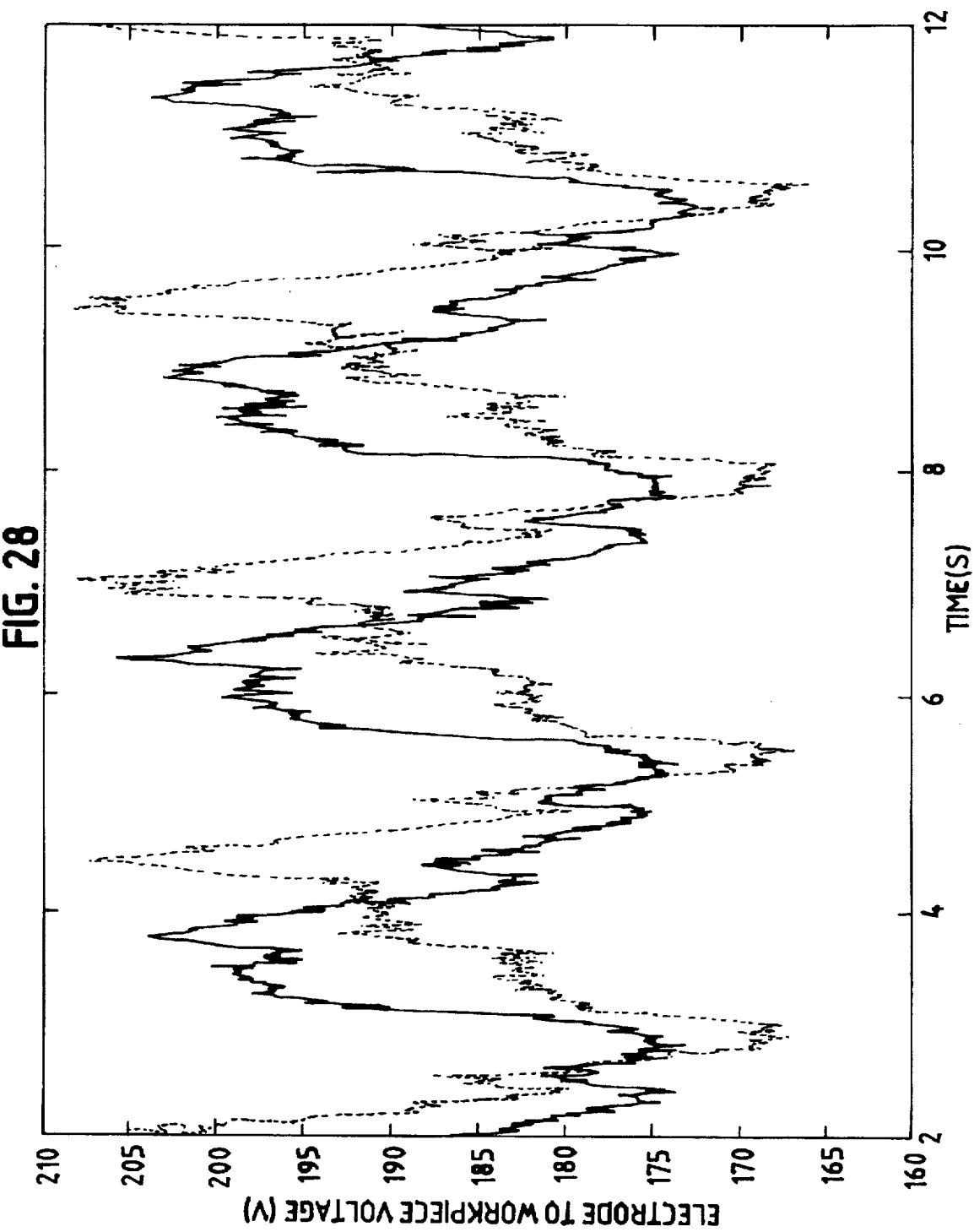

In relation to the third and fourth aspects of the invention, as shown in FIG. 27(a) and (b) the anode spot 10 moves higher or lower on the bevelled surface 31 of the frustroconical electrode (workpiece) 30, with an increasing degree of nozzle erosion (see 10 and 10' respectively on FIG. 27(a), and 10 and 10' respectively on FIG. 27(b)). Hence, the amplitude of the electrode to workpiece voltage oscillations caused by relative rotation between the bevelled surface 31 and the torch 1 increases with an increasing degree of nozzle erosion 22. This is illustrated in FIG. 28 depicting the electrode 13 to workpiece 30 voltage oscillations for a smaller (solid line) and greater (dotted line) degree of wear. These oscillations were recorded with the workpiece 30 rotating around the MAX200 Machine Torch with 100A nozzles as shown in FIG. 19d.

According to the invention, torch condition monitoring apparatus measures the voltages, performs suitable signal pre-processing (for example isolation and scaling), signal processing (for example filtering and offset adjustment) and automatically determines the condition of the torch nozzle (in relation to non-axisymmetric wear) based on a comparison with values corresponding to a nozzle in good condition.

The result of the comparison can be displayed in the form of information for an operator about the condition of the torch nozzle and/or can be used to stop the cutting operation automatically and initiate automatic change of the torch or nozzle.

Persons skilled in the art will appreciate that the invention described herein is susceptible to variations and modifications other than those specifically described and it is to be understood that the invention includes all such variations and modifications which fall within the spirit and scope of the accompanying claims.

We claim:

1. A method for detecting non-axisymmetric wear of a nozzle of a plasma arc torch while a plasma jet is being generated by the torch including:
    (i) arranging a probe adjacent to the plasma jet,
    (ii) measuring an electrical parameter associated with the plasma jet via the probe, and
    (iii) determining from said electrical parameter measurement whether there is any deflection of the plasma jet, said deflection being indicative of said non-axisymmetric wear.

2. A method as claimed in claim 1 wherein the measured electrical parameter is a voltage.

3. A method as claimed in claim 1 wherein the probe is located between the nozzle of the torch and a workpiece, and a voltage across a component of the torch and the probe, or the probe and a workpiece to which the arc is attached, is measured.

4. A method as claimed in claim 3 wherein the component of the torch is an electrode.

5. A method as claimed in claim 3 wherein the component of the torch is the nozzle.

6. A method as claimed in claim 3 wherein the probe includes a plurality of elements arranged around the plasma jet, the said measurement step involving simultaneous measurement of a voltage via each element.

7. A method as defined in claim 6 wherein the said determining step involves comparison of the respective component-element voltage measurements, any deflection of the plasma jet being indicated by an increased voltage value at one or more elements in comparison to at least one other element.

8. A method as claimed in claim 7 wherein the amount of any non-axisymmetric wear of the nozzle is determined from the magnitude of the voltage measurements.

9. Apparatus for detecting non-axisymmetric wear of a nozzle of a plasma arc torch while a plasma jet is being generated by the torch, the apparatus including a plasma torch having a probe for measuring an electrical parameter associated with a plasma jet and wherein the probe is adapted to detect deflections of the plasma jet generated by the torch, and wherein the probe is positioned in proximity to the nozzle of the torch such that during operation of the torch, the probe is adjacent the position of the plasma jet as the jet emerges from an orifice of the nozzle.

10. Apparatus as claimed in claim 9 wherein the probe comprises a plurality of elements for providing measurements of the electrical parameter for different locations around the jet.

11. Apparatus as claimed in claim 10 wherein the elements are transverse wires, each of which is directed towards the plasma jet, the plurality of wires being arranged to surround the plasma jet such that their ends adjacent the jet are substantially equi-spaced from the axis of the torch.

12. Apparatus as claimed in claim 10 wherein the torch includes a shield that provides the said probe, the shield being formed of a number of electrically isolated segments.

13. Apparatus as claimed in claim 10 wherein the measured electrical parameter is voltage, the apparatus including means for measuring voltages across a component of the torch and the individual probe elements.

14. Apparatus as claimed in claim 13 wherein the component of the torch is an electrode.

15. Apparatus as claimed in claim 13 wherein the component of the torch is the nozzle.

16. Apparatus as claimed in claim 13 including biasing means associated with the individual probe elements for increasing the sensitivity of the voltage measurements.

17. Apparatus as claimed in claim 16 wherein the biasing means is a voltage dividing resistance network connected between each element and the said torch component.

18. Apparatus as claimed in claim 16 wherein the biasing means is a voltage source.

19. Apparatus as claimed in claim 13 including means for comparing the respective voltage measurements.

20. Apparatus as claimed in claim 19 wherein the comparing means includes means for subtracting the voltage measurements from oppositely located elements.

21. Apparatus as claimed in claim 20 wherein the comparing means includes additional means for comparing the resultant voltage subtractions.

22. A method for detecting non-axisymmetric wear of a nozzle of a plasma arc torch while a plasma jet is being generated by the torch including measuring an electrical parameter associated with the plasma jet while relatively rotating the torch and an external electrode surface on which the plasma arc from the torch is attached and which is angled with respect to the torch axis, and determining from said electrical parameter whether there is any change in length of the plasma arc, said change in length being indicative of said non-axisymmetric wear.

23. A method as claimed in claim 22 wherein the measured electrical parameter is voltage across an electrode of the torch and the said external electrode, changes in length of the said arc being indicated by variations in the measured voltage.

24. A method as claimed in claim 22 or claim 23, wherein the method is performed while operating the torch during a process for cutting a metal workpiece, the said angled electrode surface being provided by the workpiece.

25. A method as claimed in claim 22 or claim 23, wherein the method is performed as an independent test, the said angled electrode surface being provided by a test workpiece.

26. A method as claimed in claim 23 including comparing the amplitude of the measured voltage with a reference voltage representative of an unworn nozzle, wherein a measured voltage amplitude that is greater than the reference voltage indicates that the nozzle has suffered non-axisymmetric erosion.

27. A method as claimed in claim 23 wherein the magnitude of the variations in the measured voltage are measured and compared with a reference value representative of an unworn nozzle, and determining from said comparison the amount of any non-axisymmetric wear suffered by the nozzle.

28. Apparatus for monitoring for non-axisymmetric wear of a nozzle of a plasma arc torch while a plasma jet is being generated by the torch, comprising an external electrode mounted in proximity to the plasma torch, wherein the external electrode provides a sloping surface with respect to the torch axis for attachment thereto of an end of a plasma arc generated by the torch, the electrode and torch being relatively rotatable, and furthermore including means for measuring an electrical parameter associated with the plasma jet for determining a change in length of an arc as the torch and sloping surface are rotated relative to each other.

29. Apparatus as claimed in claim 28 wherein the means for measuring an electrical parameter measures voltage across an electrode of the torch and the said external electrode.

30. Apparatus as claimed in claim 29 wherein the electrical parameter measuring means includes a voltage dividing resistance network connected between the torch electrode and the external electrode.

31. Apparatus as claimed in claim 29 including means for comparing the measured voltage with a reference voltage representative of a nozzle not having any non-axisymmetric wear.

32. Apparatus as claimed in claim 29 wherein the external electrode is rotatably mounted and is frustoconical in shape.

33. Apparatus as claimed in claim 32 wherein the external electrode is water cooled.

* * * * *